United States Patent
Takata et al.

(10) Patent No.: US 9,745,859 B2
(45) Date of Patent: Aug. 29, 2017

(54) RADIAL-INFLOW TYPE AXIAL FLOW TURBINE AND TURBOCHARGER

(71) Applicant: MITSUBISHI HEAVY INDUSTRIES, LTD., Tokyo (JP)

(72) Inventors: Ryo Takata, Tokyo (JP); Katsuyuki Osako, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/890,833

(22) PCT Filed: Jun. 20, 2013

(86) PCT No.: PCT/JP2013/066963
§ 371 (c)(1),
(2) Date: Nov. 12, 2015

(87) PCT Pub. No.: WO2014/203372
PCT Pub. Date: Dec. 24, 2014

(65) Prior Publication Data
US 2016/0160672 A1 Jun. 9, 2016

(51) Int. Cl.
*F02D 23/00* (2006.01)
*F04D 29/44* (2006.01)
(Continued)

(52) U.S. Cl.
CPC ............. *F01D 11/08* (2013.01); *F01D 1/04* (2013.01); *F01D 1/20* (2013.01); *F01D 9/02* (2013.01);
(Continued)

(58) Field of Classification Search
CPC . F01D 11/08; F01D 9/02; F01D 9/026; F02B 39/00; F05D 2220/40; F04D 29/4226; F04D 29/4233
(Continued)

(56) References Cited

U.S. PATENT DOCUMENTS

| | | |
|---|---|---|
| 4,184,812 A | 1/1980 | Nomura et al. |
| 4,648,790 A | 3/1987 | Hörler |
| | (Continued) | |

FOREIGN PATENT DOCUMENTS

| | | |
|---|---|---|
| EP | 0 131 736 A1 | 1/1985 |
| EP | 0 491 134 A1 | 6/1992 |
| | (Continued) | |

OTHER PUBLICATIONS

Extended European Search Report effective Sep. 5, 2016 issued in the corresponding EP Application No. 13887473.0.
(Continued)

*Primary Examiner* — Jason Shanske
*Assistant Examiner* — Ngoc T Nguyen
(74) *Attorney, Agent, or Firm* — Birch, Stewart, Kolasch & Birch, LLP

(57) ABSTRACT

An object is to provide an axial flow turbine of radial-inflow type whereby it is possible to suppress a decrease in turbine efficiency due to tip leakage, and a turbocharger having the same. An axial flow turbine of radial-inflow type includes a housing having a scroll part for swirling working fluid flowing into the housing (40) along a circumferential direction of a rotation shaft and a bend part (52) for changing a flow direction of the working fluid flowing inwardly in the radial direction from the scroll part into a direction along the axial direction to direct the working fluid to turbine blades (30). The bend part includes a tip-side inner wall surface (60) of a bend shape at least in a region at an upstream side, in the axial direction, of a portion (36H) of a leading edge (36) of the turbine blades, the portion being adjacent to a hub. The bend shape of the tip-side inner wall surface along the axial direction has a minimum curvature radius $R_{min}$ at a position $X_Z$ near the turbine blades, and a curvature radius $R$ ($>R_{min}$) at the upstream side of the position $X_Z$.

14 Claims, 12 Drawing Sheets

(51) Int. Cl.
*F01D 11/08* (2006.01)
*F01D 9/02* (2006.01)
*F02B 39/00* (2006.01)
*F02C 6/12* (2006.01)
*F01D 1/04* (2006.01)
*F01D 1/20* (2006.01)

(52) U.S. Cl.
CPC ............... *F02B 39/00* (2013.01); *F02C 6/12* (2013.01); *F05D 2220/40* (2013.01); *F05D 2240/307* (2013.01)

(58) Field of Classification Search
USPC .......................................................... 60/602
See application file for complete search history.

(56) References Cited

U.S. PATENT DOCUMENTS

| | | |
|---|---|---|
| 4,850,820 A | 7/1989 | Gutknecht |
| 4,926,642 A | 5/1990 | Buthmann et al. |
| 5,215,436 A | 6/1993 | Puzyrewski |

FOREIGN PATENT DOCUMENTS

| | | |
|---|---|---|
| EP | 2 378 064 A2 | 10/2011 |
| GB | 1 561 338 A | 2/1980 |
| GB | 2469101 A | 10/2010 |
| JP | 53-17818 A | 2/1978 |
| JP | 60-13926 A | 1/1985 |
| JP | 64-69716 A | 3/1989 |
| JP | 9-144550 A | 6/1997 |
| JP | 2005-240727 A | 9/2005 |
| JP | 2010-169047 A | 8/2010 |

OTHER PUBLICATIONS

Decision to Grant a Patent effective Aug. 31, 2016 issued to the corresponding Japanese Application No. 2015-522434 with an English Translation.
IPRP delievered on Dec. 30, 2015 in International Application No. PCT/JP2013/066963 with an English Translation.
Extended European Search Report dated Feb. 10, 2017 issued in corresponding EP Application No. 16194815.3.
Extended European Search Report dated Feb. 2, 2017 issued in corresponding EP Application No. 16194815.3.
Office Action effective Apr. 10, 2017 issued to the corresponding Chinese Application No. 201380077537.1 with an English Translation.

RADIAL-INFLOW TYPE AXIAL FLOW TURBINE AND TURBOCHARGER

TECHNICAL FIELD

The present disclosure relates to an axial flow turbine of radial-inflow type and a turbocharger.

BACKGROUND ART

In recent years, an axial flow turbine of radial-inflow type which causes working fluid to flow in an axial direction to act on turbine blades of a turbine wheel and rotates the turbine wheel has been developed. Such an axial flow turbine of radial-inflow type is, for instance, considered to be advantageous in a small supercharger such as a turbocharger for an automobile, whose turbo rug is desired to be reduced by decreasing inertia.

Patent Document 1 discloses a turbocharger including an axial flow turbine of radial-inflow type configured such that exhaust gas from a scroll part acts on leading edges of turbine blades substantially in the axial direction.

Further, though not related to an axial flow turbine, Patent Document 2 discloses a mixed flow turbine for a supercharger configured to direct exhaust gas from a scroll chamber to a turbine impeller with a leading edge part formed diagonally to the axial direction. The mixed flow turbine has an intermediate property between a radial flow turbine and an axial flow turbine.

CITATION LIST

Patent Literature

Patent Document 1: U.S. Pat. No. 4,850,820B
Patent Document 2: JPH9-144550A

SUMMARY

Problems to be Solved

Meanwhile, in a typical axial flow turbine, it is necessary to avoid contact between tips of turbine blades and an inner wall surface of a housing, and thus tip clearance is provided between the tips of the turbine blades and the inner wall surface of the housing. In this way, when an axial flow turbine is in use, a pressure differential is created between a pressure surface side (concave side) and a suction surface side (convex side) of a turbine blade. The pressure differential may act as a driving force that causes leakage (tip leakage) of working fluid via the tip clearance.

Specifically in a small axial flow turbine used for a turbocharger for an automobile or the like, the ratio of the tip clearance to the blade length (blade height) tends to become so large that a decrease in the turbine efficiency due to tip leakage cannot be ignored.

In a small axial flow turbine, the ratio of the tip clearance to the blade length tends to become large for the following reason.

That is, the size of the tip clearance is set taking account of vibration predicted to occur during operation of the axial flow turbine and machining accuracy of a bearing that rotatably supports a rotation shaft of the axial flow turbine, for instance. Therefore, there is a limit in reducing the tip clearance in accordance with a decrease in the blade length, and thus the tip clearance becomes large relative to the blade length of the turbine blades in a small axial flow turbine.

Patent Document 1 does not disclose a configuration for suppressing tip leakage in an axial flow turbine.

Further, the turbine for a supercharger described in Patent Document 2 is not an axial flow turbine but a mixed flow turbine, and thus the flow of exhaust gas directed to the turbine blades from the scroll chamber is considerably different from that of an axial flow turbine. Thus, Patent Document 2 does not even suggest a configuration for suppressing tip leakage in an axial flow turbine.

In this regard, an object of some embodiments of the present invention is to provide an axial flow turbine of radial-inflow type whereby it is possible to suppress a decrease in turbine efficiency due to tip leakage, and a turbocharger having the same.

Solution to the Problems

An axial flow turbine of radial-inflow type according to some embodiments of the present invention is for recovering power from energy of working fluid, and comprises: a rotation shaft extending in an axial direction of the axial flow turbine; a turbine wheel including a plurality of turbine blades each extending from a blade root (hub) to a blade tip (tip) outwardly in a radial direction of the axial flow turbine, the turbine wheel being configured to rotate together with the rotation shaft; and a housing including a scroll part for swirling the working fluid flowing into the housing along a circumferential direction of the rotation shaft and a bend part for changing a flow direction of the working fluid flowing inwardly in the radial direction from the scroll part into a direction along the axial direction to direct the flow of the working fluid to the turbine blades. The bend part includes a tip-side inner wall surface of a bend shape at least in a region at an upstream side, in the axial direction, of a portion of a leading edge of the turbine blades, the portion being adjacent to a hub (the tip-side inner wall surface is a portion of the inner wall surface of the bend part at the outer side in the radial direction of the axial flow turbine, the portion being adjacent to the tip). The bend shape of the tip-side inner wall surface along the axial direction has: a minimum curvature radius at a position $X_Z$ between an upstream position in the axial direction represented by $X_{upst}=X_0-0.5$ w and a downstream position in the axial direction represented by $X_{downst}=X_0+0.5$ W, where a position in the axial direction of a starting point of the bend shape is $X=0$, a position in the axial direction of the leading edge at the blade tip is $X=X_0$, and W is a width along the axial direction of the turbine blade at the blade tip; and a curvature radius at the upstream side, in the axial direction, of the position $X_Z$, the curvature radius being greater than the minimum curvature radius.

In the above axial flow turbine of radial-inflow type, the bend shape of the tip-side inner wall surface of the bend part, along the axial direction, has the minimum curvature radius at the position $X_Z$, in the axial direction, in the vicinity of the leading edge of the turbine blades. Thus, when working fluid flowing through the bend part flows through the position $X_Z$ in the axial direction, the centrifugal force due to the minimum curvature radius forms a pressure distribution (pressure gradient) from the tip side to the hub side. Specifically, the centrifugal force due to the minimum curvature radius reduces the pressure of the working fluid at the tip side, while the pressure of the working fluid increases at the hub side, and thereby the pressure gradient of the working fluid is formed. Thus, at the tip side, the velocity of the working fluid (a velocity component in the axial direction) increases in accordance with the pressure decrease. As described above, the velocity component, in the axial direction, of the relative velocity vector of the working fluid acting on the turbine blade increases at the tip side. As a result, the turning angle of the flow of the working fluid (an angle formed between the relative velocity vector of the working fluid acting on the turbine blades and the relative velocity vector of the working fluid flowing out from the turbine blades) decreases. As a result, the pressure differential between the concave side and the convex side of the turbine blades at the tip side decreases with a decrease in the turning angle of the flow, which suppresses leakage of the working fluid via the tip clearance and improves turbine efficiency.

The tip leakage can be effectively suppressed in the above axial flow turbine of radial-inflow type by a simple approach of changing the shape of the bend part, because the bend part having the minimum curvature radius at the position $X_Z$ has the tip-side inner wall surface of the bend shape at least in a region at the upstream side, in the axial direction, of a portion adjacent to the hub, of the leading edge of the turbine blades. In other words, there is at least partially the tip-side inner wall surface of the bend shape at such a position (a region at the upstream side of the hub of the leading edge of the turbine blades) that can contribute in changing the direction of the flow of the working fluid from the scroll part, which is the very reason why it is possible to utilize the centrifugal force due to the minimum curvature radius at the position $X_Z$ to increase the velocity component in the axial direction of the working fluid flowing while changing its direction along the tip-side inner wall surface, and to decrease the turning angle of the flow at the tip side.

In some embodiments, the blade tip faces an inner wall surface of the housing not via a seal member, and a gap is formed between the blade tip and the inner wall surface of the housing.

As described above, even if there is no seal member in the tip clearance between the tip of the turbine blade and the inner wall surface of the housing, it is possible to suppress a decrease in the turbine efficiency due to tip leakage in the above axial flow turbine of radial-inflow type by using the bend part having the minimum curvature radius at the position $X_Z$. Thus, it is possible to dispense with a seal member while maintaining the turbine efficiency. For instance, even for a relatively-large axial flow turbine which is often equipped with a seal member such as a labyrinth seal disposed in the tip clearance, it may be possible to dispense with such a seal member while maintaining the turbine efficiency. If a seal member can be dispensed with, it is possible to reduce the manufacturing cost of an axial flow turbine and it is no longer necessary to perform maintenance on such a seal member.

In some embodiments, the bend shape includes a discontinuous point at which a first linear section at an upstream side of the position $X_Z$ intersects with a second linear section at a downstream side of the position $X_Z$, and the discontinuous point has the minimum curvature radius at the position $X_Z$.

With the minimum curvature radius at the position $X_Z$ realized by an intersection between the first linear section and the second linear section as described above, it is possible to simplify the bend shape considerably as compared to a case where the minimum curvature radius at the position $X_Z$ is realized by a complex shape of a curved surface, which makes it possible to reduce the machining cost of the axial flow turbine. Further, as compared to a case in which the minimum curvature radius is realized by a complex shape of a curved surface, the position $X_Z$ at which the minimum curvature radius is actually formed is determined precisely without being affected by the machining accuracy of the bend part, which makes it possible to achieve the desired tip-leakage suppression effect securely due to the minimum curvature radius at the position $X_Z$.

In some embodiments, the bend shape of the bend part has two or more curvature radii of different sizes at least in a positional range of $0 \leq X \leq X_Z$ in the axial direction, and the two or more curvature radii are arranged in the positional range in a descending order of curvature radius toward the downstream side from the upstream side in the axial direction.

In this case, in the above positional range ($0 \leq X \leq X_Z$), the curvature radius of the bend shape gradually decreases from the upstream side toward the downstream side, and reaches its minimum at the position $X_Z$ in the axial direction at the most downstream side. In this way, it is possible to cause the working fluid having the above pressure gradient formed by a great centrifugal force due to the minimum curvature radius at the position $X_Z$ in the axial direction to act directly on the turbine blades. As a result, it is possible to reduce the turning angle of the flow at the tip side of the working fluid acting on the turbine blade effectively. Thus, it is possible to suppress a decrease in the turbine efficiency due to the tip leakage effectively.

In some embodiments, a part of the tip-side inner wall surface of the bend part is formed by a projecting portion disposed on the position $X_Z$ so as to project inwardly in the radial direction from other part of the tip-side inner wall surface, and a projection end of the projecting portion has the minimum curvature radius.

In this case, it is possible to adjust the minimum curvature radius easily by changing the shape of the projecting portion. Further, as compared to a bend part without the projecting portion, it is easier to make the minimum curvature radius smaller by the projecting portion, which makes it possible to suppress a decrease in the turbine efficiency due to tip leakage effectively.

In one embodiment, the projecting portion includes an annular plate portion extending inwardly in the radial direction from the other part of the tip-side inner wall surface, and an edge of the projection end of the annular plate portion has the minimum curvature radius.

In this case, it is possible to achieve easily a bend shape with a desired minimum curvature radius due to the annular plate portion.

In one embodiment, the projection end is disposed on an outer side of the blade tip in the radial direction.

In this case, since the projection end of the projecting portion is disposed on the radially outer side of the tip of the turbine blades, the turbine blades would not receive a substantial influence from a swirl which may be formed downstream the projecting portion. Thus, it is possible to benefit from the effect to suppress tip leakage achieved by the projecting portion having the minimum curvature radius while preventing a decrease in the turbine efficiency due to a swirl created by the projecting portion.

In another embodiment, the projecting portion is disposed on an upstream side of the blade tip in the axial direction. The projection end is disposed on an inner side of the blade tip in the radial direction. The housing is dividable into a first section including the projecting portion and a second section at a downstream side of the first section.

In this case, while the turbine efficiency may decrease due to a swirl formed downstream the projecting portion, improvement of the turbine efficiency can be expected from the tip-leakage suppression effect achieved by the minimum curvature radius of the projecting portion. Further, using a housing dividable into the first section including the projecting portion and the second section at the downstream side of the first section makes it possible to improve the assembly performance of the axial flow turbine.

In some embodiments, a tip surface of the turbine blade is inclined from the axial direction so that a blade length (blade height) of the turbine blade gradually increases from the leading edge toward a trailing edge, and the inner wall surface of the housing is inclined from the axial direction along the tip surface of the turbine blade.

Separation is greatly affected by the inclination of the inner wall surface of the housing (casing) at the upstream side of the leading edge of the turbine blade. However, in the present embodiment, the casing shape at the upstream side of the leading edge of the turbine blade is not changed, i.e., the risk of separation is not changed, but it is possible to reduce the minimum curvature radius of the bend part even further, which makes it possible to prevent a decrease in the turbine efficiency due to tip leakage effectively.

In some embodiments, the housing includes a protruding portion protruding inwardly in the radial direction at a position in the axial direction corresponding to an outlet of the turbine wheel.

In this case, in the vicinity of the outlet of the turbine wheel, the leaking path of the working fluid via the tip clearance is blocked by the protruding portion of the housing, which makes it possible to suppress the tip leakage of the working fluid even further.

In some embodiments, a shape along the axial direction of the inner wall surface of the housing facing the blade tip has at least one negative curvature radius between the position X=0 at an upstream end of the bend part and a position offset toward the downstream side in the axial direction by a distance of D=1.5×W from the trailing edge at the blade tip of the turbine blade.

A turbocharger according to some embodiments of the present invention comprises an axial flow turbine of radial-inflow type configured to be driven by exhaust gas from an internal combustion engine and a compressor configured to be driven by the axial flow turbine to compress intake air to the internal combustion engine. The axial flow turbine comprises: a rotation shaft extending in an axial direction of the axial flow turbine; a turbine wheel including a plurality of turbine blades each extending from a blade root to a blade tip outwardly in a radial direction of the axial flow turbine, the turbine wheel being configured to rotate together with the rotation shaft; and a housing including a scroll part for swirling the working fluid flowing into the housing along a circumferential direction of the rotation shaft and a bend part for changing a flow direction of the working fluid flowing inwardly in the radial direction from the scroll part into a direction along the axial direction to direct the flow of the working fluid to the turbine blades. The bend part includes a tip-side inner wall surface of a bend shape at least in a region at an upstream side, in the axial direction, of a portion of a leading edge of the turbine blade, the portion being adjacent to a hub, and the bend shape of the tip-side inner wall surface along the axial direction has a minimum curvature radius at a position $X_Z$ between an upstream position in the axial direction represented by $X_{upst}=X_0-0.5W$ and a downstream position in the axial direction represented by $X_{downst}=X_0+0.5W$, where a position in the axial direction of a starting point of the bend shape is X=0, a position in the axial direction of the leading edge at the blade tip is $X=X_0$, and W is a width along the axial direction of the turbine blade at the blade tip, and a curvature radius at the upstream side, in the axial direction, of the position $X_Z$, the curvature radius being greater than the minimum curvature radius.

With the above turbocharger, the bend shape of the tip-side inner wall surface of the axial flow turbine of radial-inflow type, along the axial direction, has the minimum curvature radius at the position $X_Z$, in the axial direction, in the vicinity of the leading edge of the turbine blade. Thus, when working fluid flowing through the bend part flows through the position $X_Z$ in the axial direction, the centrifugal force due to the minimum curvature radius forms a pressure distribution from the tip side (low-pressure side) to the hub side (high-pressure side). Thus, at the tip side, the velocity of the working fluid (a velocity component in the axial direction) increases in accordance with the pressure decrease, and the turning angle of the flow of the working fluid decreases. As a result, the pressure differential between the concave side and the convex side of the turbine blade at the tip side decreases, which suppresses leakage of the working fluid via the tip clearance and improves turbine efficiency.

An axial flow turbine of radial-inflow type according to some embodiments of the present invention is for recovering power from energy of working fluid, and comprises: a rotation shaft extending in an axial direction of the axial flow turbine; a turbine wheel including a plurality of turbine blades each extending from a blade root to a blade tip outwardly in a radial direction of the axial flow turbine, the turbine wheel being configured to rotate together with the rotation shaft; and a housing including a scroll part for swirling the working fluid flowing into the housing along a circumferential direction of the rotation shaft and a bend part for changing a flow direction of the working fluid flowing inwardly in the radial direction from the scroll part into a direction along the axial direction to direct the flow of the working fluid to the turbine blades. The bend part includes a tip-side inner wall surface of a bend shape at least in a region at an upstream side, in the axial direction, of a portion of a leading edge of the turbine blade, the portion being adjacent to a hub. The bend shape of the tip-side inner wall surface along the axial direction includes a first linear section, a second linear section disposed on a downstream side of the first linear section in the axial direction, and a corner section at which the first linear section intersects with the second linear section.

With the above axial-flow turbine of radial-inflow type, since the bend shape of the tip-side inner wall surface along the axial direction has a corner section at which the first linear section intersects with the second linear section at the downstream side of the first linear section, the centrifugal force due to the corner section forms a pressure distribution from the tip side (low-pressure side) to the hub side (high-pressure side) when the working fluid flows through the corner section having the extremely small curvature radius. Thus, at the tip side, the velocity of the working fluid (a velocity component in the axial direction) increases in accordance with the pressure decrease, and the turning angle of flow of the working fluid decreases. As a result, the pressure differential between the concave side and the convex side of the turbine blade at the tip side decreases, which suppresses leakage of the working fluid via the tip clearance and improves turbine efficiency. Further, the bend part mainly constituted by the first linear section and the second linear section can be easily made by machining, which makes it possible to reduce the machining cost of the axial flow turbine.

The tip leakage can be effectively suppressed in the above axial flow turbine of radial-inflow type by a simple approach of changing the shape of the bend part, because the bend part having the corner section creating the pressure gradient of the working fluid has the tip-side inner wall surface at least in a region at the upstream side, in the axial direction, of a portion adjacent to the hub, of the leading edge of the turbine blade. In other words, there is the tip-side inner wall surface of the bend shape at such a position (a region at the upstream side of the hub of the leading edge of the turbine blade) that can contribute in changing the direction of the flow of the working flow from the scroll part, which is the very reason why it is possible to utilize the great centrifugal force due to the corner section to increase the velocity component in the axial direction of the working fluid flowing while changing its direction along the tip-side inner wall surface, and to decrease the turning angle of the flow at the tip side.

In some embodiments, the corner section is disposed at a position $X_Z$ between an upstream position in the axial direction represented by $X_{upst}=X_0-0.5$ W and a downstream position in the axial direction represented by $X_{downst}=X_0+0.5$ w, where a position in the axial direction of a starting point of the bend shape is $X=0$, a position in the axial direction of the leading edge at the blade tip is $X=X_0$, and W is a width along the axial direction of the turbine blade at the blade tip.

In this way, the centrifugal force due to the corner section forms the pressure distribution (pressure gradient) from the tip side to the hub side in the working fluid acting on the turbine blade appropriately. Thus, the pressure differential between the concave side and the convex side of the turbine blade decreases due to a decrease in the turning angle at the tip side, which suppresses the tip leakage effectively.

Advantageous Effects

According to some embodiments of the present invention, a pressure distribution (pressure gradient) is formed from the tip side to the hub side in the working fluid acting on the turbine blade by adjusting the shape of the bend part, and at the tip side, the velocity of the working fluid (velocity component in the axial direction) increases with a pressure decrease. As a result, the turning angle of the flow of the working fluid decreases at the tip side and the pressure differential between the concave side and the convex side of the turbine blade decreases, which suppresses leakage of the working fluid via the tip clearance. Thus, it is possible to suppress a decrease in the turbine efficiency due to the tip leakage.

DETAILED DESCRIPTION

Embodiments of the present invention will now be described in detail with reference to the accompanying drawings.

However, the scope of the present invention is not limited to the following embodiments. It is intended that dimensions, materials, shapes, relative positions and the like of components described in the embodiments shall be interpreted as illustrative only and not limitative of the scope of the present invention.

Figure 1:
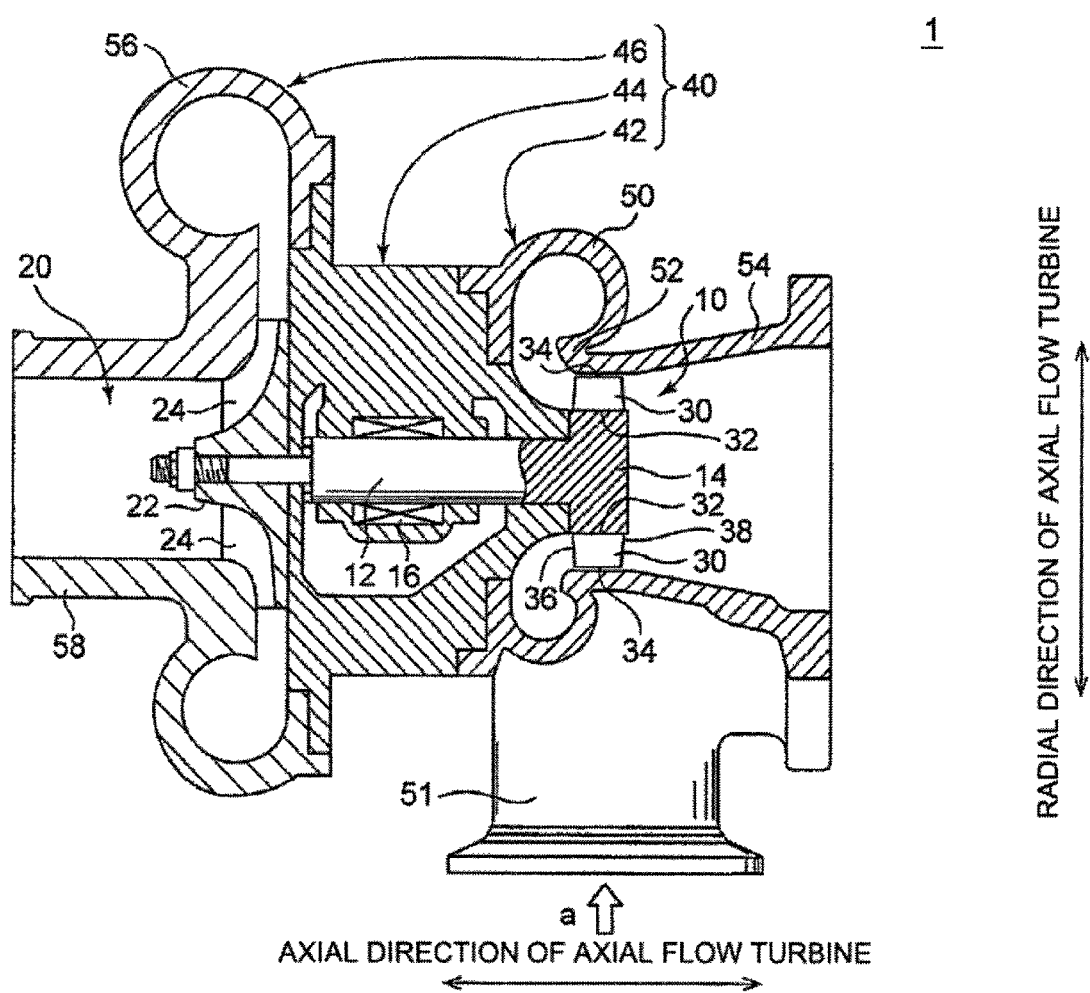
FIG. 1 is a schematic cross-sectional view of a turbocharger according to one embodiment of the present invention.

FIG. 1 is a schematic cross-sectional view of a turbocharger according to one embodiment of the present invention. A turbocharger 1 illustrated in FIG. 1 is not particularly limited and only needs to be a supercharger for forcedly sending intake air into an internal combustion engine. For instance, the turbocharger may be a turbocharger for an automobile, or a turbocharger for a ship.

In some embodiments, as illustrated in FIG. 1, the turbocharger 1 includes an axial flow turbine 10 and a compressor 20 driven by the axial flow turbine 10. The axial flow turbine 10 is configured to be driven by exhaust gas from an internal combustion engine (not illustrated). The compressor 20 is configured to be driven by the axial flow turbine 10 to compress intake air flowing into the internal combustion engine.

The axial flow turbine 10 includes a rotation shaft 12 extending in the axial direction and a turbine wheel 14 which is rotatable together with the rotation shaft 12. In this way, when energy of the exhaust gas from the internal combustion engine serving as high-temperature and high-pressure working fluid is recovered by the turbine wheel 14, the turbine wheel 14 and the rotation shaft 12 rotate together.

In the embodiment illustrated in FIG. 1, the rotation shaft 12 of the axial flow turbine 10 is rotatably supported to a housing 40 by a bearing 16. Further, the rotation shaft 12 is coupled to a compressor wheel 22 of a compressor 20 at the opposite side from the axial flow turbine 10 across the bearing 16 in the axial direction.

The turbine wheel 14 includes a plurality of turbine blades (turbine impeller) 30. Each turbine blade 30 extends outwardly in the radial direction of the axial flow turbine 10 from a hub 32 toward a tip 34. Further, between the hub 32 and the tip 34, the turbine blade 30 has an airfoil formed by a concave surface (pressure surface) and a convex surface (suction surface). The concave surface and the convex surface forming the airfoil are connected to each other at the upstream side in the axial direction to form a leading edge 36, and connected to each other at the downstream side in the axial direction to form a trailing edge 38.

In one embodiment, the rotation shaft 12 and the turbine wheel 14 formed as separate members are coupled to each other, so that the rotation shaft 12 and the turbine wheel 14 rotate together. In another embodiment, the rotation shaft 12 and the turbine wheel 14 are formed as a single peace, and thereby the rotation shaft 12 and the turbine wheel 14 rotate together.

The turbine wheel 14 is covered by a housing 40. In the embodiment illustrated in FIG. 1, the housing 40 is configured to be dividable into the following three sections: a turbine housing 42, a bearing housing 44, and a compressor housing 46. The turbine housing 42 is disposed so as to cover mainly the turbine wheel 14. The bearing housing 44 is disposed so as to cover mainly the bearing 16. The compressor housing 46 is disposed so as to cover mainly the compressor wheel 22.

The positions of the dividing lines between the sections (42, 44, 46) of the housing 40 are not particularly limited, and are set suitably in view of the assembly performance of the turbocharger 1. Further, the number of divided sections of the housing 40 is not limited to three, and the housing 40 may be dividable into a certain number other than three (e.g. four or more) of divided sections.

The housing 40 (in the embodiment illustrated in FIG. 1, the turbine housing 42) includes a scroll part 50 for introducing exhaust gas into the housing 40 and a bend part 52 for directing the exhaust gas from the scroll part 50 to the turbine blades 30.

The scroll part 50 is configured to swirl the exhaust gas flowing in from an exhaust-gas inlet 51 (see arrow a) in the circumferential direction of the rotation shaft 12. The swirl flow of the exhaust gas flows out from the scroll part 50 inwardly in the radial direction of the axial flow turbine 10. The exhaust gas having flowed out from the scroll part 50 is directed toward the turbine blades 30 by the bend part 52. At this time, the direction of the flow of the exhaust gas flowing inwardly in the radial direction from the scroll part 50 is changed into a direction along the axial direction of the axial flow turbine 10 by the bend part 52. The exhaust gas whose flow direction has been accordingly changed by the bend part 52 acts on the turbine blades 30 and rotates the turbine wheel 14. Then, the exhaust gas having performed work on the turbine wheel 14 is discharged from a gas outlet 54 disposed on the housing 40 (in the embodiment illustrated in FIG. 1, the turbine housing 42).

The rotation shaft 12 of the axial flow turbine 10 is coupled to the compressor wheel 22 of the compressor 20 at the opposite side from the axial flow turbine 10 across the bearing 16, as described above. Thus, the torque from the turbine wheel 14 is inputted into the compressor wheel 22 via the rotation shaft 12. As a result, when the turbine wheel 14 rotates powered by the energy recovered from the exhaust gas, the compressor wheel 22 also rotates together with the turbine wheel 14.

The housing 40 (in the embodiment illustrated in FIG. 1, the compressor housing 46) includes an air inlet 58 for introducing air into the housing 40. The air from the air inlet 58 is directed to a plurality of impellers 24 of the rotating compressor wheel 22, and is compressed when passing through the impellers 24. The air compressed by the compressor wheel 22 (compressed air) is discharged from a compressed-air outlet (scroll) 56 disposed on the housing 40 (in the embodiment illustrated in FIG. 1, the compressor housing 46), and then sent into the internal combustion engine.

Figure 2:
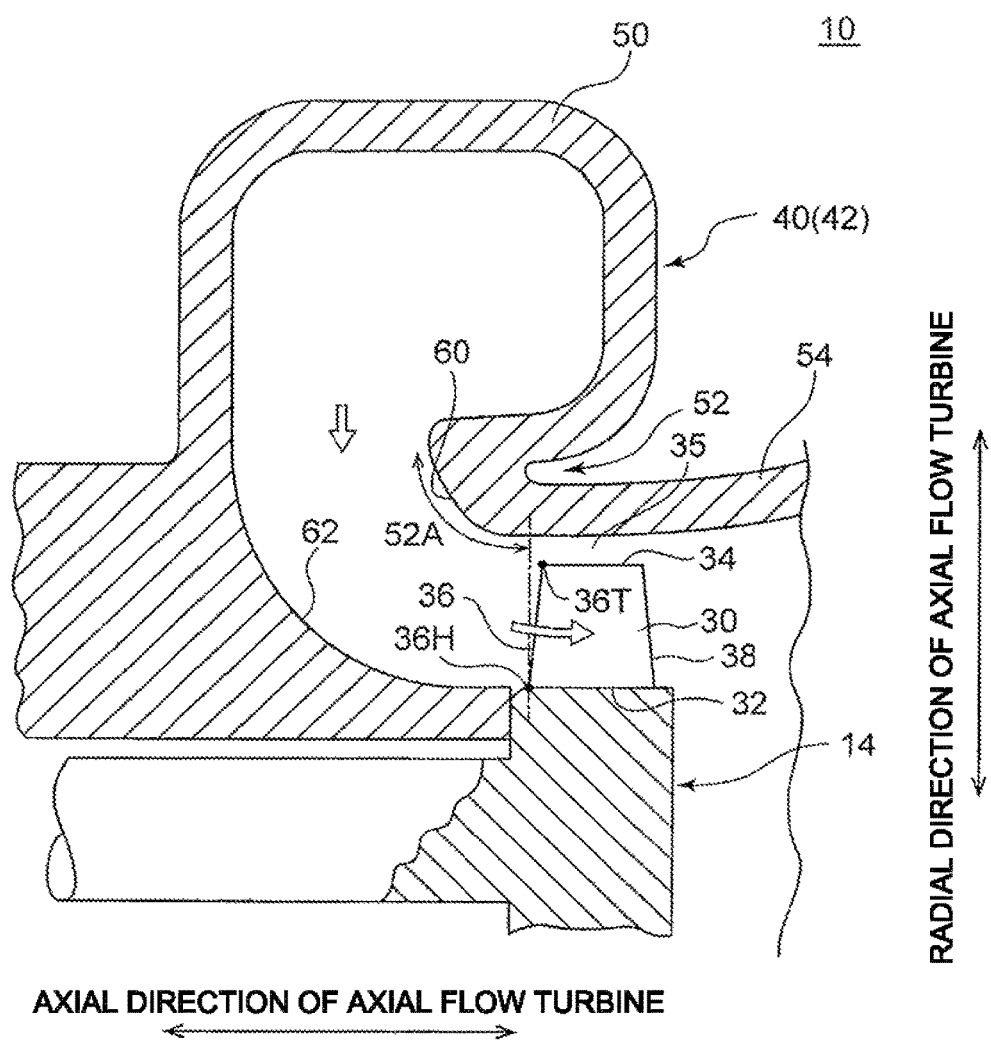
FIG. 2 is a schematic cross-sectional view of an axial flow turbine according to one embodiment.
Figure 3A:
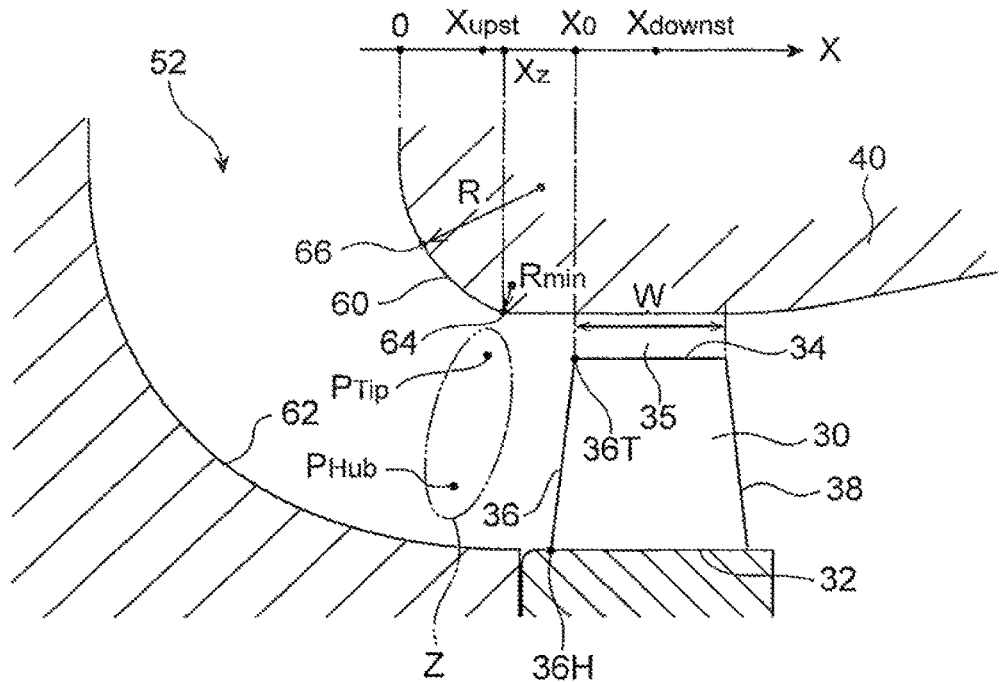
FIG. 3A is a schematic cross-sectional view of a bend part of an axial flow turbine according to one embodiment, and the peripheral structure thereof.
Figure 3B:
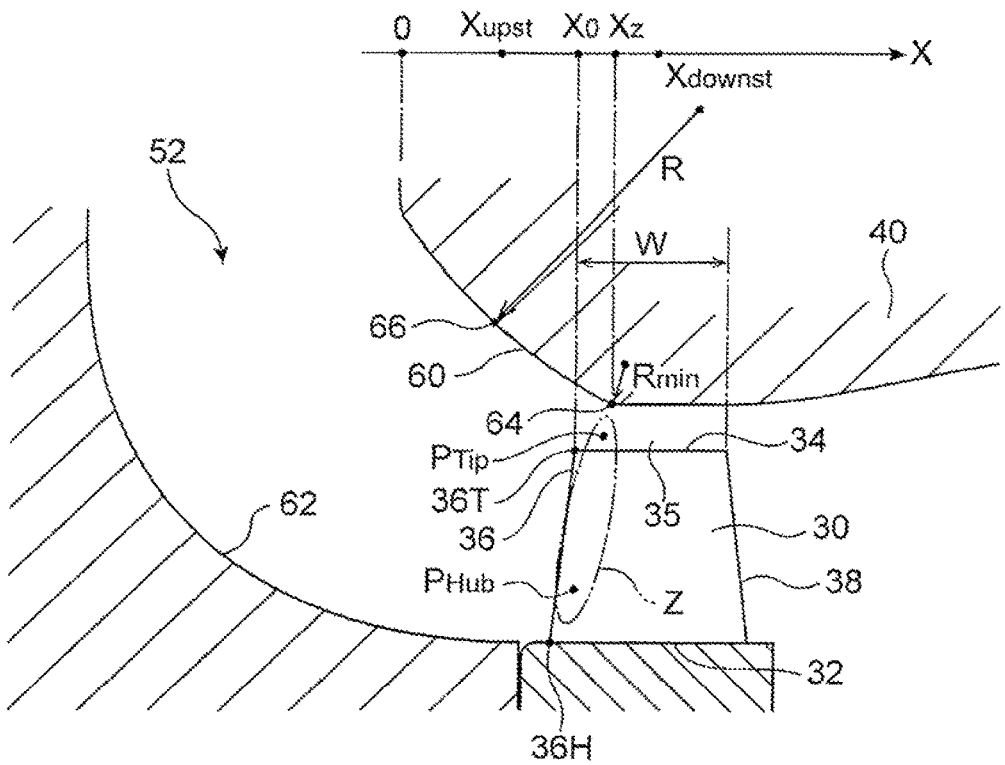
FIG. 3B is a schematic cross-sectional view of a bend part of an axial flow turbine according to one embodiment, and the peripheral structure thereof.
Figure 3C:
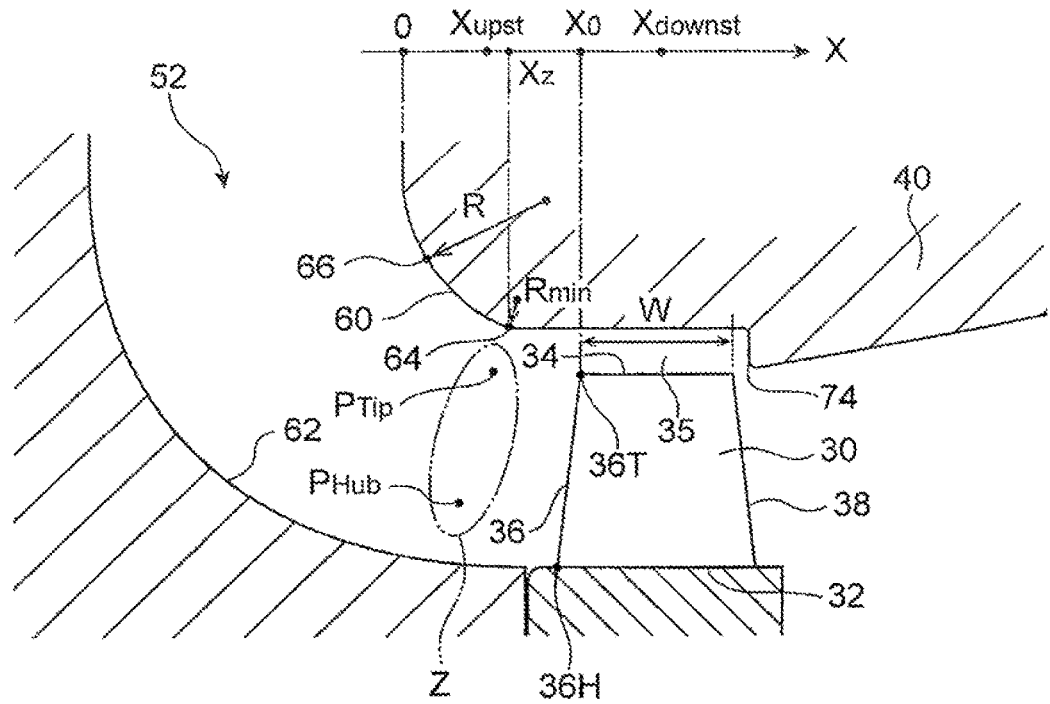
FIG. 3C is a schematic cross-sectional view of a bend part of an axial flow turbine according to one embodiment, and the peripheral structure thereof.

Now, the bend shape of the bend part 52 of the axial flow turbine 10 will be described in detail. FIG. 2 is a schematic cross-sectional view of the axial flow turbine 10 according to one embodiment. FIGS. 3A to 3O are each a schematic cross-sectional view of a bend part of the axial flow turbine 10 according to one embodiment, and the peripheral structure thereof. In FIGS. 3A to 3O, x-axis is a coordinate parallel to the axial direction of the axial flow turbine 10, and the origin (X=0) is the position, in the axial direction, of the starting point of the bend shape of the bend part 52.

In some embodiments, as illustrated in FIG. 2, the bend part 52 includes a tip-side inner wall surface 60 having a bend shape, at least in a region 52A at the upstream side, in the axial direction, of a portion 36H of the leading edge 36 of the turbine blade 30, the portion 36H being adjacent to the hub 32. Specifically, the tip-side inner wall surface 60 having a bend shape, of the bend part 52, is present at least in the region 52A at the upstream side, in the axial direction, of the portion 36H of the turbine blade 30.

The tip-side inner wall surface 60 having a bend shape may be disposed entirely over the region 52A, or partially in the region 52A. Further, the tip-side inner wall surface 60 having a bend shape may extend from the region 52A toward the downstream side, and terminate at a downstream position, in the axial direction, of the portion 36H of the turbine blade 30.

The tip-side inner wall surface 60 described here is a portion of the inner wall surface of the bend part 52 forming a part of a path of working fluid in the axial flow turbine 10, the portion being adjacent to the tip 34 disposed at the outer side in the radial direction of the turbine. On the other hand, of the inner wall surface of the bend part 52, a portion adjacent to the hub 32 disposed at the inner side in the radial direction of the turbine is a hub-side inner wall surface 62 that faces the tip-side inner wall surface 60. Basically, while the tip-side inner wall surface 60 is a convex surface as a whole, the hub-side inner wall surface 62 is a concave surface as a whole. However, the tip-side inner wall surface 60 may be partially formed by a concave surface, and the hub-side inner wall surface 62 may be partially formed by a convex surface.

In some embodiments, the bend shape along the axial direction of the turbine of the tip-side inner wall surface 60 has a maximum curvature section 64 defined by the minimum curvature radius $R_{min}$ at the position $X_Z$, and a portion 66 defined by a curvature radius R at the upstream side, in the axial direction, of the position $X_Z$, as illustrated in FIGS. 3A to 3O. The curvature radius R is greater than the minimum curvature radius $R_{min}$ of the maximum curvature section 64 (i.e., $R>R_{min}$). In some embodiments, the position $X_Z$ of the maximum curvature section 64 is between an upstream position in the axial direction of the turbine represented by $X_{upst}=X_0-0.5$ w, and a downstream position in the axial direction of the turbine represented by $X_{downst}=X_0+0.5$ w. Herein, W is a turbine-blade tip width, which is a width in the axial direction of the turbine (direction X) of the turbine blade 30 at the tip 34. Further, the position $X_0$ is a position, in the axial direction, of the leading edge 36 at the tip 34 (i.e., of the leading edge 36, the position, in the axial direction, of a portion 36T at the tip side).

In a case where there is the maximum curvature section 64 having the minimum curvature radius $R_{min}$ at the position $X_Z$ in the axial direction in the vicinity of the leading edge of the turbine blade as described above, when the working fluid flowing through the bend part 52 passes through the position $X_Z$ in the axial direction in the vicinity of the leading edge of the turbine blade, the working fluid is affected by a centrifugal force due to the minimum curvature radius $R_{min}$. Thus, in a region Z around the maximum curvature section 64 (a region on an extended line in the radial direction of the minimum curvature radius $R_{min}$ as seen from the maximum curvature section 64), a pressure distribution (pressure gradient) is formed from the tip side to the hub side by the centrifugal force due to the minimum curvature radius $R_{min}$ of the maximum curvature section 64. Specifically, the centrifugal force due to the minimum curvature radius $R_{min}$ reduces the pressure $P_{Tip}$ of the working fluid at the tip side of the region Z, while the pressure $P_{Hub}$ of the working fluid increases at the hub side of the region Z. Thus, at the tip side of the region Z, the velocity of the working fluid (a velocity component in the axial direction) increases in accordance with the pressure decrease. Therefore, the turning angle of the flow of the working fluid acting on the tip side of the turbine blade 30 is small. As a result, the pressure differential between the concave side and the convex side of the turbine blade 30 at the tip side decreases with a decrease in the turning angle of the flow, which suppresses leakage of the working fluid via a tip clearance 35 and improves turbine efficiency. The tip clearance 35 is a gap formed between the tip 34 and the inner wall surface of the housing 40.

The tip-leakage suppression effect due to the centrifugal force of the minimum curvature radius $R_{min}$ of the bend part 52 can be achieved if the position of the minimum curvature radius $R_{min}$ is in the vicinity of the leading edge of the turbine blade, and the position $X_Z$ in the axial direction of the minimum curvature radius $R_{min}$ may be either at the upstream side or at the downstream side of the portion 36T of the turbine blade 30.

In the embodiment illustrated in FIGS. 3A, 3C, 3D, and 3F to 3O, the maximum curvature section 64 defined by the minimum curvature radius $R_{min}$ at the position $X_Z$ in the axial direction is in the range of $X_{upst}<X_Z<X_0$, which is an upstream side of the portion 36T of the turbine blade 30. On the other hand, in the embodiment illustrated in FIGS. 3B and 3E, the maximum curvature section 64 defined by the minimum curvature radius $R_{min}$ at the position $X_Z$ in the axial direction is in the range of $X_0<X_Z<X_{downst}$, which is a downstream side of the portion 36T of the turbine blade 30.

In one embodiment, the position $X_Z$ in the axial direction of the maximum curvature section 64 is set within a range of $X_0-0.35$ w$\leq X_0 \leq X_0+0.35$ w. In this case, the maximum curvature section 64 is positioned in a range close to the leading edge of the turbine blade, which further improves the tip-leakage suppression effect achieved by the centrifugal force due to the minimum curvature radius $R_{min}$.

Further, with the position $X_Z$ in the axial direction of the maximum curvature section 64 set within a range of $X_0-0.2$ w$\leq X_0 \leq X_0+0.2$ w, it is possible to suppress tip leakage even more effectively.

In some embodiments, there is no seal member provided in the gap (tip clearance 35) formed between the tip 34 and the inner wall surface of the housing 40, and thus the tip 34 faces the inner wall surface of the housing 40 not via a seal member.

As described above, even if there is no seal member in the tip clearance 35, it is possible to suppress a decrease in the turbine efficiency due to tip leakage by using the bend part 52 having the minimum curvature radius $R_{min}$ at the position $X_Z$ in the axial direction. Thus, it is possible to dispense with a seal member while maintaining the turbine efficiency. For instance, even for a relatively-large axial flow turbine which is often equipped with a seal member such as a labyrinth seal disposed in the tip clearance, it may be possible to dispense with such a seal member while maintaining the turbine efficiency. If a seal member can be dispensed with, it is possible to reduce the manufacturing cost of an axial flow turbine and it is no longer necessary to perform maintenance on such a seal member.

Now, with reference to FIGS. 4A, 4B, and 5, the turbine-efficiency improvement effect of the centrifugal force due to the minimum curvature radius $R_{min}$ of the bend part 52 will be described in detail.

Figure 4A:
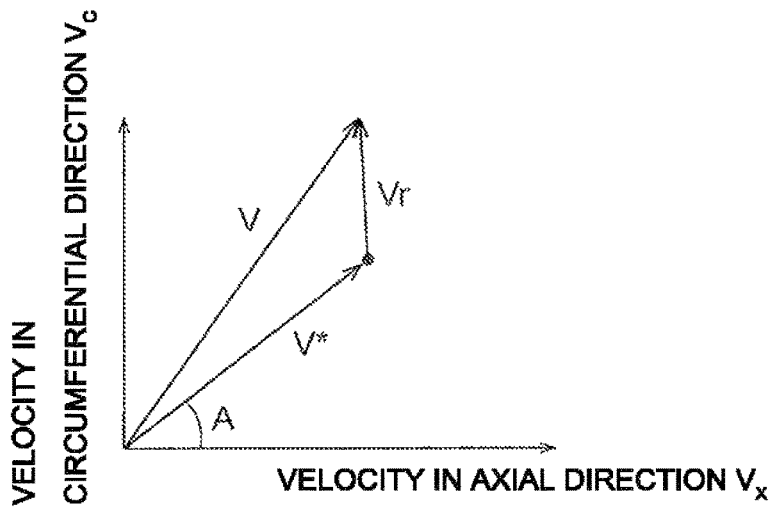
FIG. 4A is a diagram illustrating a velocity triangle of a tip side of a region Z in FIGS. 3A to 3O according to one embodiment.

FIG. 4A is a diagram illustrating a velocity triangle at the tip side in the region Z in the embodiment where the bend part 52 has the maximum curvature section 64 at the position $X_Z$ in the axial direction in the vicinity of the leading edge of the turbine blade, and a portion 66 at the upstream side in the axial direction of the position $X_Z$. FIG. 4B is a velocity triangle at the tip side of the region Z in a comparison example where the curvature radius of the tip-side inner wall surface of the bend part is constant regardless of the position in the axial direction. FIG. 5 is a diagram for describing a turning angle of a flow of working fluid according to one embodiment.

Figure 4B:
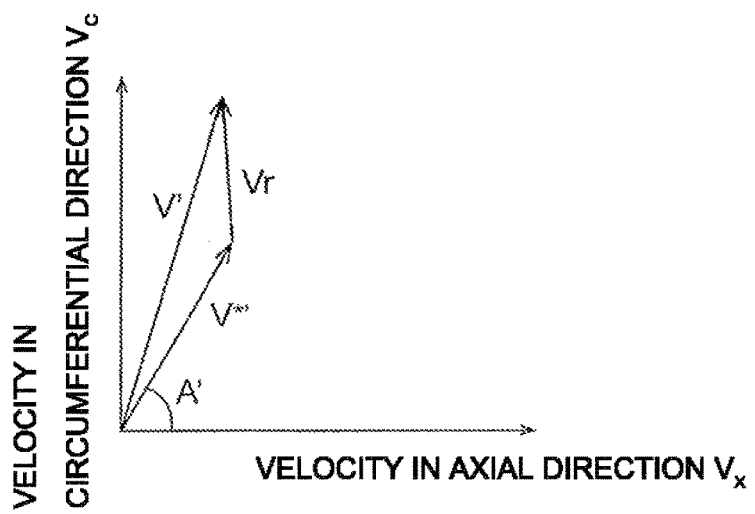
FIG. 4B is a diagram illustrating a velocity triangle of a tip side in a comparative example that corresponds to FIG. 4A.
Figure 5:
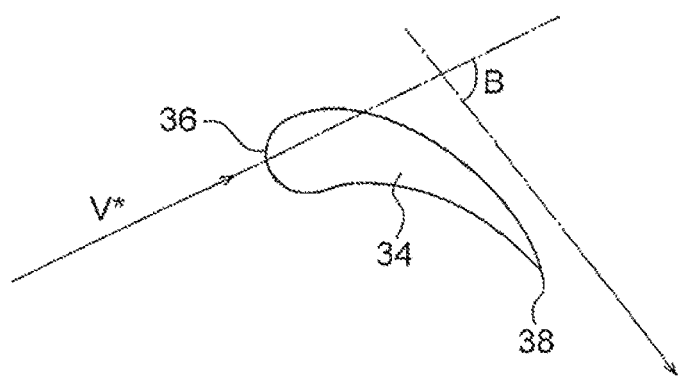
FIG. 5 is a diagram for describing a turning angle of a flow of working fluid according to one embodiment.

As illustrated in FIGS. 4A and 4B, with the bend part 52 according to the embodiment, the velocity component $v_X$ in the axial direction of the absolute velocity vector V acting on the turbine blade 30 increases as compared to the comparison example. On the other hand, the velocity component $v_C$ in the circumferential direction of the absolute velocity vector V is basically given to the working fluid by the scroll part 50 and does not depend on the shape of the bend part 52. Thus, there is no difference between the velocity component $v_C$ in the circumferential direction of the absolute velocity vector V in the present embodiment (FIG. 4A) and that in the comparison example (FIG. 4B). Therefore, in the present embodiment, an angle (inflow angle) A formed between the axial direction of the turbine and a relative velocity vector V* obtained by subtracting the tip-speed vector Vr of the turbine blade 30 from the absolute velocity vector V is small. As a result, according to the present embodiment, the turning angle B (see FIG. 5) of the flow of the working fluid acting on the side of the tip 34 of the turbine blade 30 is smaller than that in the comparison example, and thus leakage of the working fluid via the tip clearance 35 is suppressed and the turbine efficiency is improved.

Figure 3D:
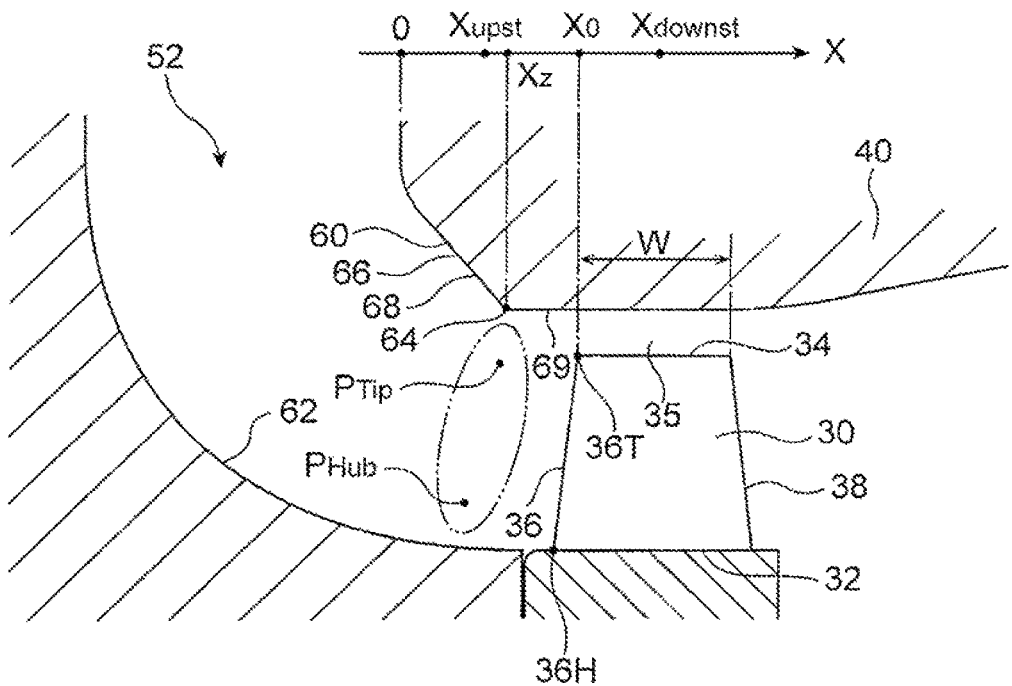
FIG. 3D is a schematic cross-sectional view of a bend part of an axial flow turbine according to one embodiment, and the peripheral structure thereof.
Figure 3E:
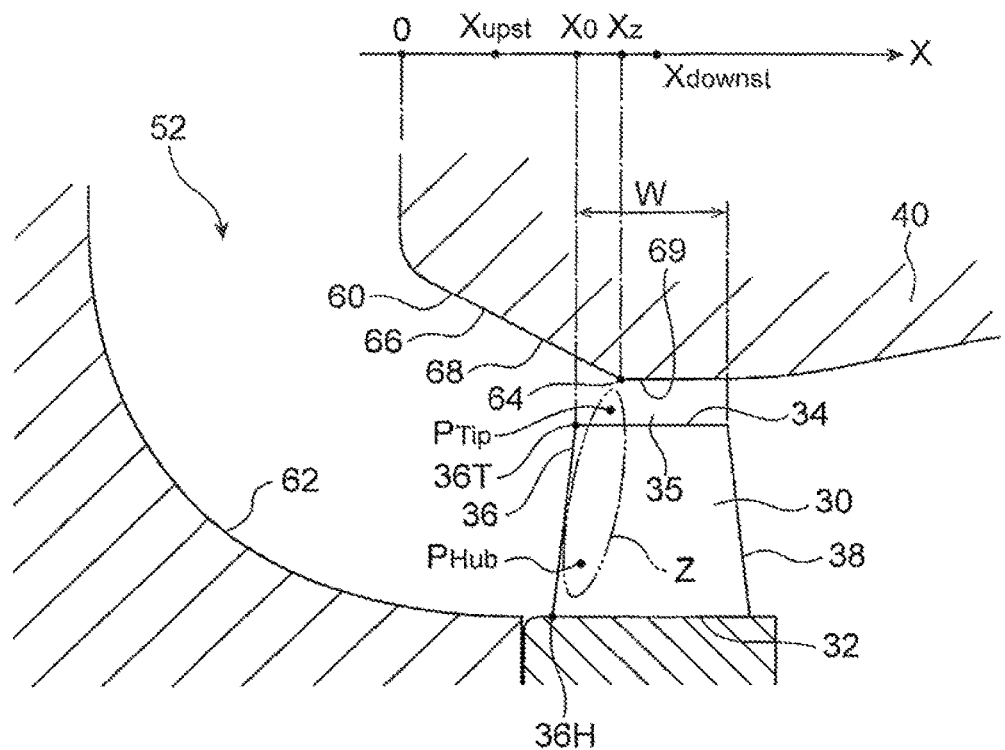
FIG. 3E is a schematic cross-sectional view of a bend part of an axial flow turbine according to one embodiment, and the peripheral structure thereof.
Figure 3F:
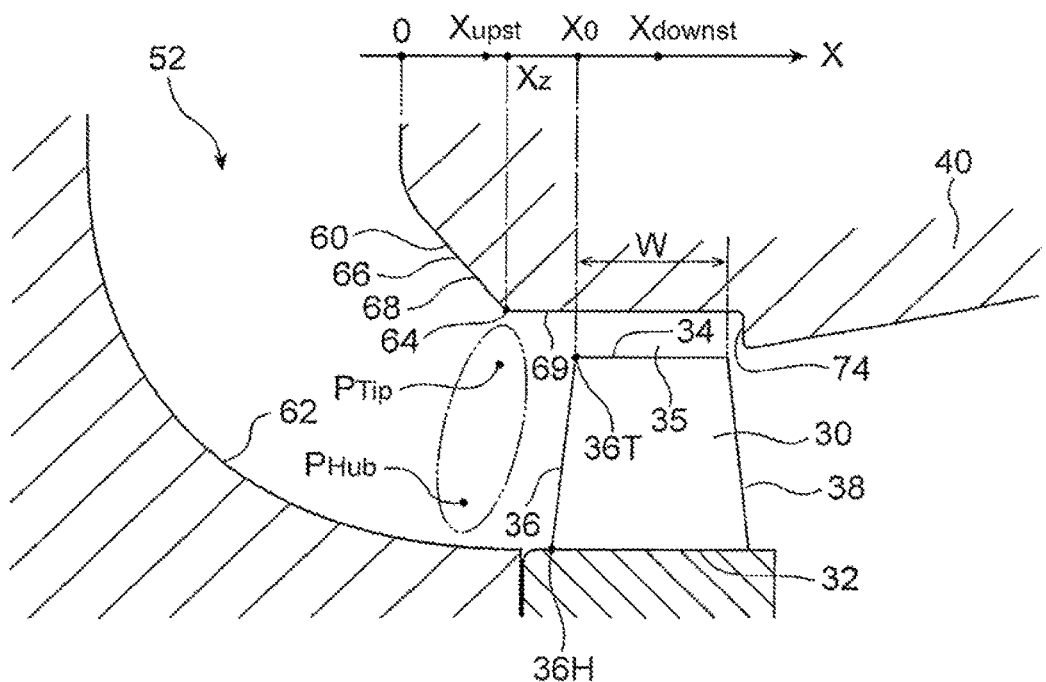
FIG. 3F is a schematic cross-sectional view of a bend part of an axial flow turbine according to one embodiment, and the peripheral structure thereof.

In some embodiments, as illustrated in FIGS. 3D to 3F, the bend shape of the tip-side inner wall surface 60 includes a discontinuous point at which the first linear section 68 at the upstream side of the position $X_Z$ in the axial direction intersects with the second linear section 69 at the downstream side of the position $X_Z$ in the axial direction. This discontinuous point forms the maximum curvature section 64 defined by the minimum curvature radius $R_{min}$. In this case, the minimum curvature radius is substantially zero (i.e. zero or a value close to zero).

On the other hand, the portion 66 defined by a curvature radius R ($>R_{min}$) at the upstream side in the axial direction of the position $X_Z$ is formed by the first linear section 68. In this case, the curvature radius R is substantially infinite.

With the minimum curvature radius $R_{min}$ (≈0) of the position $X_Z$ in the axial direction realized by an intersection between the first linear section 68 and the second linear section 69 as in the embodiment illustrated in FIGS. 3D to 3F, it is possible to simplify the bend shape considerably as compared to a case where the minimum curvature radius of the position $X_Z$ is realized by a complex shape of a curved surface, which makes it possible to reduce the machining cost of the axial flow turbine 10. Further, as compared to a case in which the minimum curvature radius is realized by a complex shape of a curved surface, the position $X_Z$ in the axial direction at which the minimum curvature radius $R_{min}$ is actually formed is determined precisely without being affected by the machining accuracy of the bend part 52, which makes it possible to achieve the desired tip-leakage suppression effect securely by the minimum curvature radius $R_{min}$ at the position $X_Z$.

Figure 3G:
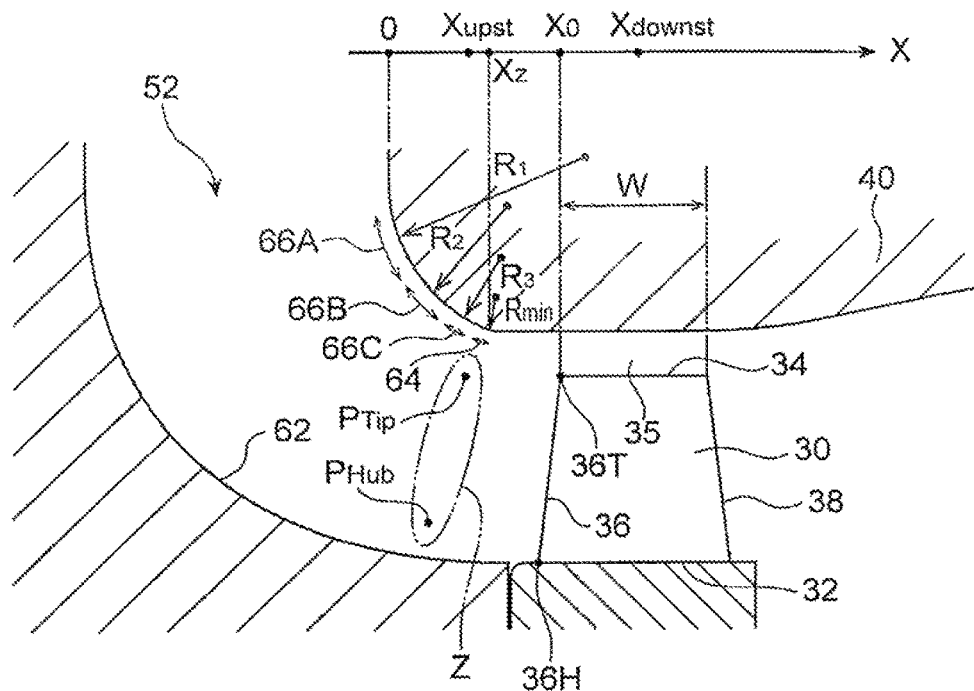
FIG. 3G is a schematic cross-sectional view of a bend part of an axial flow turbine according to one embodiment, and the peripheral structure thereof.
Figure 3H:
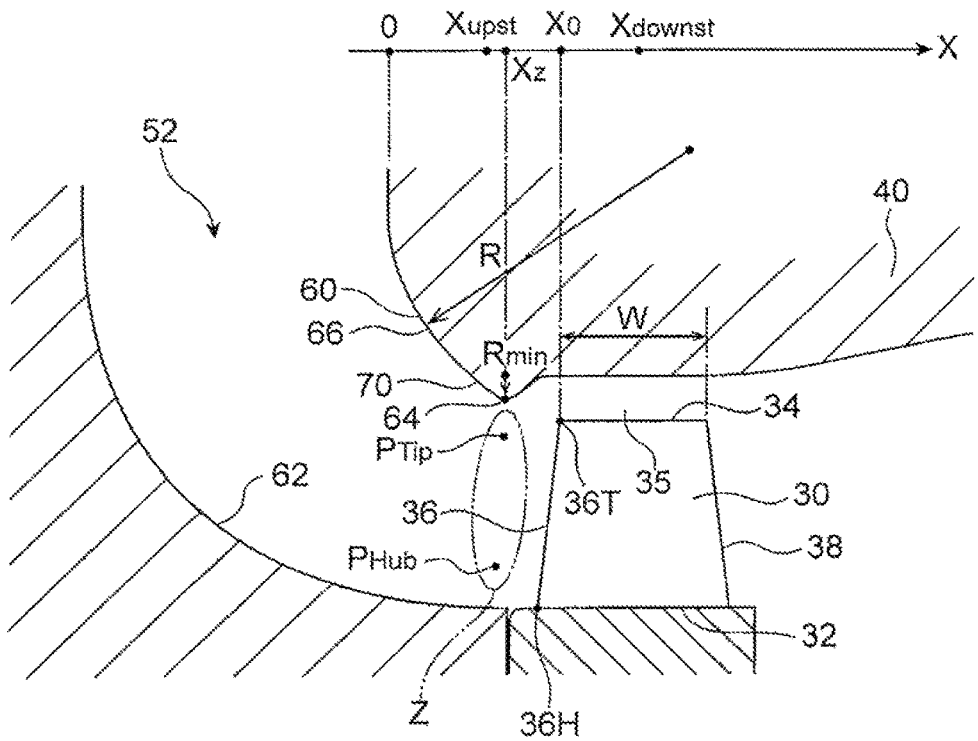
FIG. 3H is a schematic cross-sectional view of a bend part of an axial flow turbine according to one embodiment, and the peripheral structure thereof.
Figure 3I:
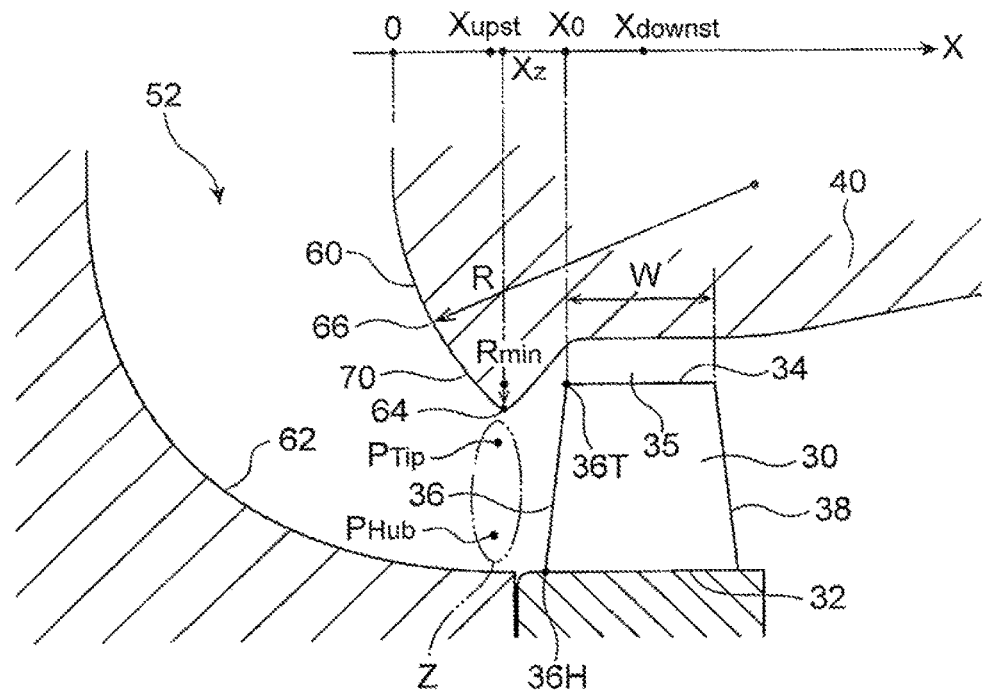
FIG. 3I is a schematic cross-sectional view of a bend part of an axial flow turbine according to one embodiment, and the peripheral structure thereof.
Figure 3J:
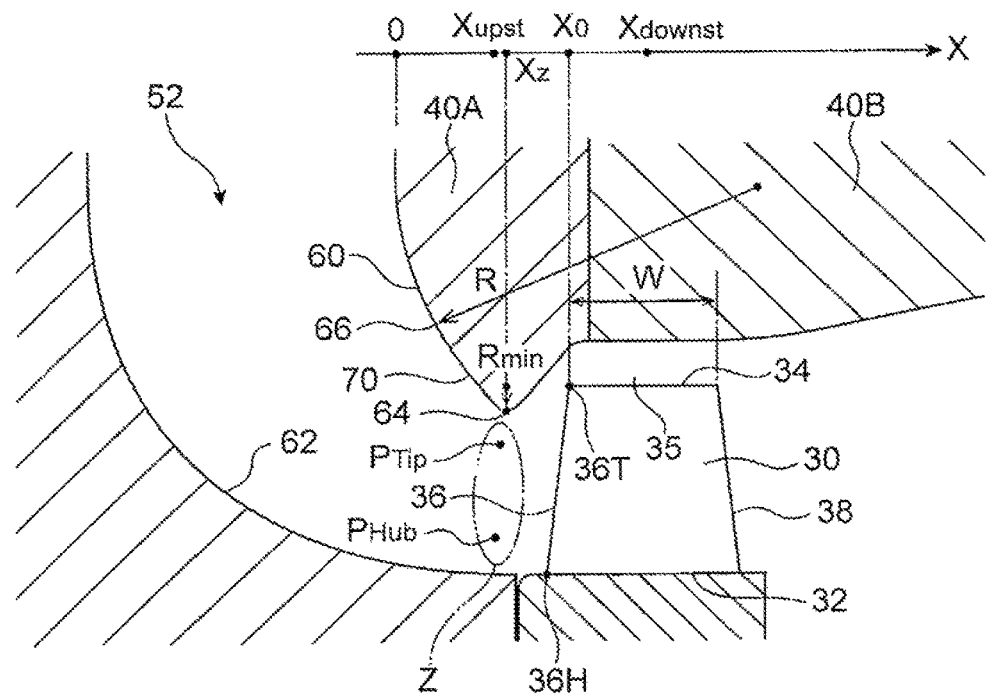
FIG. 3J is a schematic cross-sectional view of a bend part of an axial flow turbine according to one embodiment, and the peripheral structure thereof.
Figure 3K:
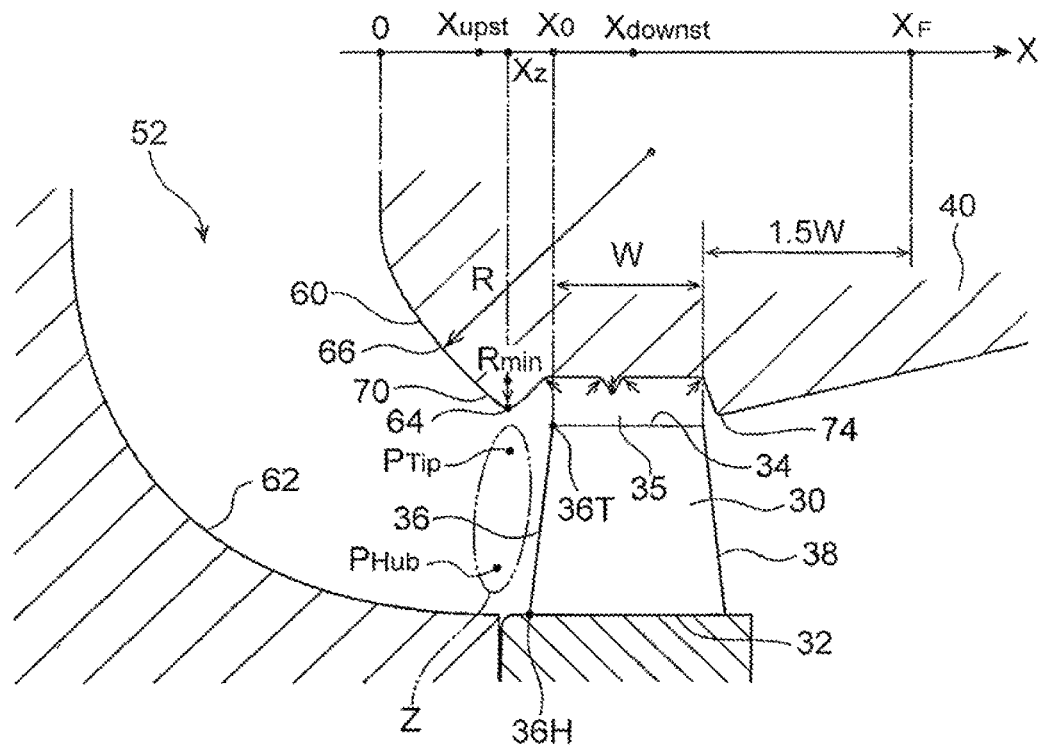
FIG. 3K is a schematic cross-sectional view of a bend part of an axial flow turbine according to one embodiment, and the peripheral structure thereof.

In some embodiments, as illustrated in FIG. 3G, the bend shape of the tip-side inner wall surface 60 has two or more curvature radii including the minimum curvature radius $R_{min}$ at least in the positional range of $0 \leq X \leq X_Z$ in the axial direction. The two or more curvature radii are arranged in a descending order of curvature radius from the upstream side toward the downstream side in the axial direction in the positional range of $0 \leq X \leq X_Z$ in the axial direction.

In this case, in the above positional range ($0 \leq X \leq X_Z$), the curvature radius of the bend shape gradually reduces from the upstream side toward the downstream side, and reaches its minimum (the minimum curvature radius $R_{min}$) at the position $X_Z$ in the axial direction at the most downstream side. In this way, it is possible to cause the working fluid having a pressure gradient of the region Z formed by a great centrifugal force due to the minimum curvature radius $R_{min}$ at the position $X_Z$ in the axial direction to act directly on the turbine blade 30. As a result, it is possible to reduce the turning angle of the flow at the tip side of the working fluid acting on the turbine blade 30 effectively. Thus, it is possible to suppress a decrease in the turbine efficiency due to the tip leakage effectively.

In the embodiment illustrated in FIG. 3G, in the positional range in the axial direction of $0 \leq X \leq X_Z$, four curvature radii $R_1$, $R_2$, $R_3$, and $R_{min}$ are arranged in this order from the upstream side toward the downstream side in the axial direction, satisfying a relationship of $R_1 > R_2 > R_3 > R_{min}$.

In some embodiments, as illustrated in FIGS. 3H to 3N, a part of the tip-side inner wall surface 60 of the bend part 52 is formed by a projecting portion 70 disposed on the position $X_Z$ in the axial direction. The projecting portion 70 is disposed so as to protrude inwardly in the radial direction of the axial flow turbine 10 from the other part of the tip-side inner wall surface 60. The maximum curvature section 64 defined by the minimum curvature radius $R_{min}$ is disposed on a tip end (projection end) of the projecting portion 70.

In this case, it is possible to adjust the minimum curvature radius $R_{min}$ easily by changing the shape of the projecting portion 70. Further, as compared to the bend part 52 without the projecting portion 70, it is easier to make the minimum curvature radius $R_{min}$ smaller by the projecting portion 70, which makes it possible to suppress a decrease in the turbine efficiency due to tip leakage effectively.

In some embodiments, the projecting portion 70 is formed as a separate member from the other part of the tip-side inner wall surface 60. In the embodiments illustrated in FIGS. 3L to 3N, the projecting portion 70 includes an annular plate portion 72 extending inwardly in the radial direction from the other part of the tip-side inner wall surface 60, and an edge on a tip end (projection end) of the annular plate portion 72 forms the maximum curvature section 64.

In this case, it is possible to adjust the minimum curvature radius $R_{min}$ optionally by the edge shape of the projection end of the annular plate portion 72 serving as the projecting portion 70, and it is possible to achieve easily a bend shape with a desired minimum curvature radius $R_{min}$.

Figure 3L:
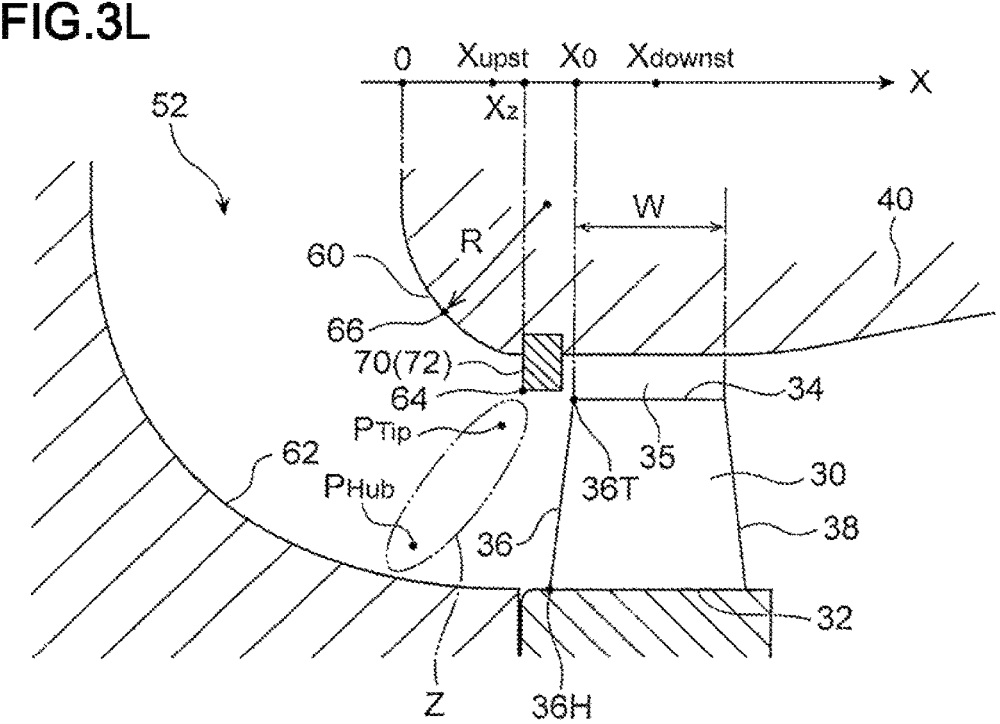
FIG. 3L is a schematic cross-sectional view of a bend part of an axial flow turbine according to one embodiment, and the peripheral structure thereof.
Figure 3M:
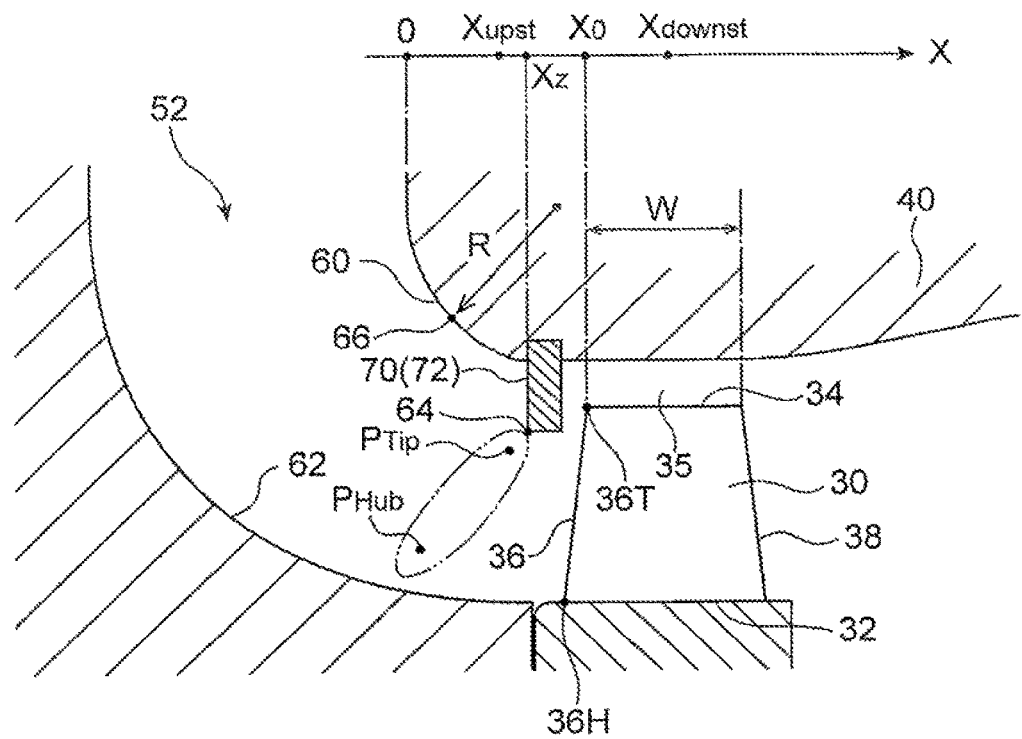
FIG. 3M is a schematic cross-sectional view of a bend part of an axial flow turbine according to one embodiment, and the peripheral structure thereof.
Figure 3N:
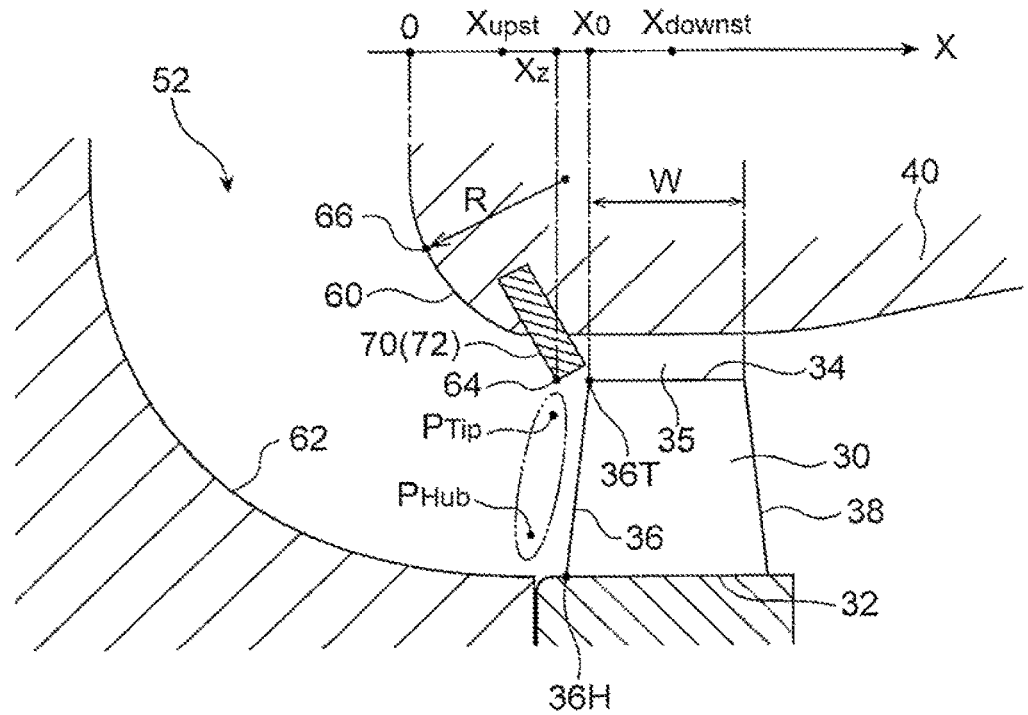
FIG. 3N is a schematic cross-sectional view of a bend part of an axial flow turbine according to one embodiment, and the peripheral structure thereof.
Figure 3O:
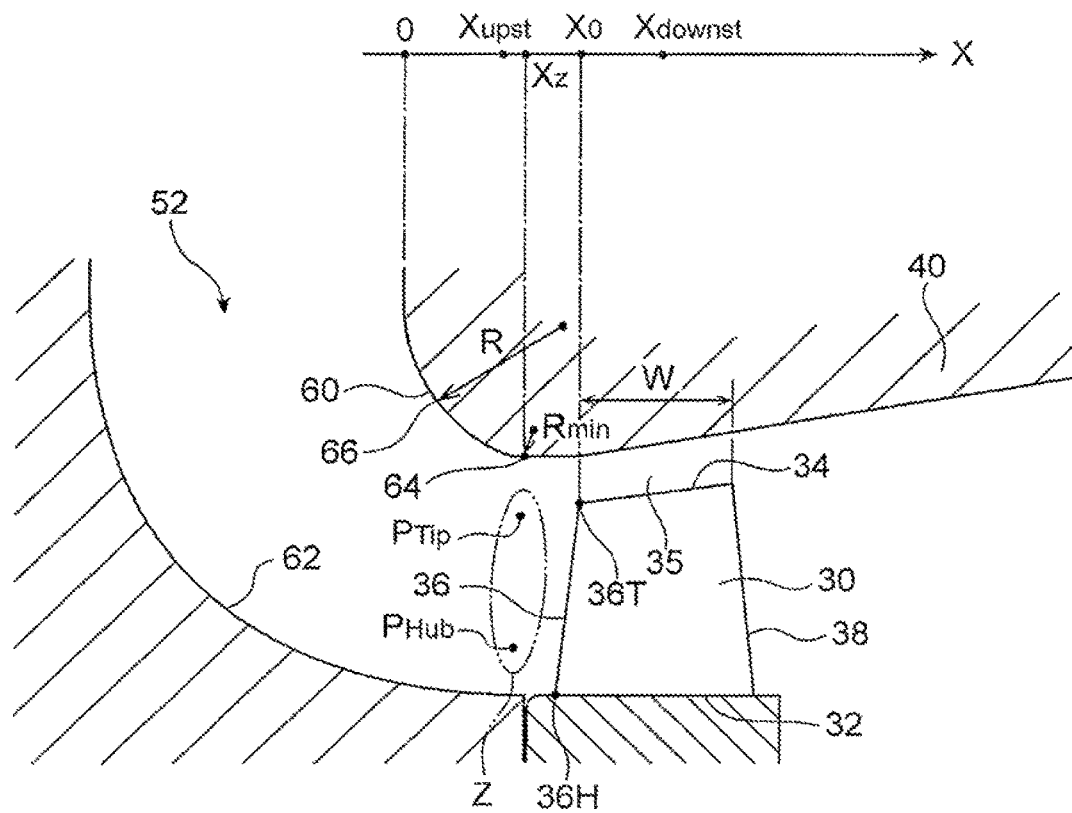
FIG. 3O is a schematic cross-sectional view of a bend part of an axial flow turbine according to one embodiment, and the peripheral structure thereof.

The annular plate portion 72 may be disposed parallel to the radial direction of the axial flow turbine 10 as illustrated in FIGS. 3L and 3M, or may be disposed so as to be inclined from the radial direction of the axial flow turbine as illustrated in FIG. 3N.

In some embodiments, as illustrated in FIGS. 3H, 3K, 3L, and 3N, the projection end of the projecting portion 70 having the minimum curvature radius $R_{min}$ is disposed on the outer side of the tip 34 of the turbine blade 30 in the radial direction of the axial flow turbine 10.

In this case, even if a swirl is produced downstream the projecting portion 70, it is possible to ignore substantially the influence of the swirl on the turbine blade 30. Thus, it is possible to prevent a decrease in the turbine efficiency due to a swirl created by the projecting portion 70.

In other embodiments, as illustrated in FIGS. 3I, 3J, and 3M, the projection end of the projecting portion 70 having the minimum curvature radius $R_{min}$ is disposed on the inner side of the tip 34 of the turbine blade 30 in the radial direction of the axial flow turbine 10.

In this case, while the turbine efficiency may decrease due to a swirl created downstream the projecting portion 70, improvement of the turbine efficiency can be expected from the tip-leakage suppression effect achieved by the minimum curvature radius $R_{min}$ of the projecting portion 70. Thus, there is a possibility of improving the turbine efficiency as a whole.

In a case where the projecting portion 70 is disposed on the upstream side, in the axial direction, of the tip 34 of the turbine blade 30 and the projection end of the projecting portion 70 is disposed on the inner side of the tip 34 in the radial direction, interference of the projecting portion 70 with the turbine blade 30 may be a problem during assembly of the axial flow turbine 10.

Thus, as illustrated in FIG. 3J, the housing 40 may be dividable into the first section 40A including the projecting portion 70 and the second section 40B positioned at the downstream side of the first section 40A. In this way, even in a case where the projecting portion 70 is disposed on the upstream side, in the axial direction, of the tip 34 of the turbine blade 30 and the projection end of the projecting portion 70 is disposed on the inner side of the tip 34 in the radial direction, it is possible to assemble the axial flow turbine 10 easily.

In some embodiments, as illustrated in FIG. 3O, the tip surface of the turbine blade 30 is inclined from the axial direction of the axial flow turbine 10 so that the blade length of the turbine blade 30 gradually increases from the leading edge 36 toward the trailing edge 38. In this case, the inner wall surface of the housing 40 is inclined from the axial direction of the axial flow turbine 10 along the tip surface of the turbine blade 30.

In this way, it is possible to suppress separation of the flow of the working fluid from the inner wall surface of the housing 40. Thus, it is possible to reduce the minimum curvature radius of the bend part 52 even further and prevent a decrease in the turbine efficiency due to tip leakage even more effectively, while reducing the risk of separation of the flow of the working fluid.

In some embodiments, as illustrated in FIGS. 3C, 3F and 3K, the housing 40 includes a protruding portion 74 protruding inwardly in the radial direction of the axial flow turbine 10 at a position, in the axial direction, corresponding to an outlet of the turbine wheel 14.

In this case, in the vicinity of the outlet of the turbine wheel 14, the leaking path of the working fluid via the tip clearance 35 is blocked by the protruding portion 74 of the housing 40, which makes it possible to suppress the tip leakage of the working fluid even further.

In some embodiments, as illustrated in FIG. 3K, the shape of the inner wall surface of the housing 40 facing the tip 34 of the turbine blade 30, along the axial direction of the axial flow turbine 10, has at least one negative curvature radius between the position X=0 at the upstream end of the bend part 52 and the position $X_F$ offset toward the downstream side in the axial direction by a distance of D=1.5×W from the trailing edge 38 of the tip 34 of the turbine blade 30.

The negative curvature radius refers to a curvature radius at which the inner wall surface of the housing 40 recesses outwardly in the radial direction of the axial flow turbine 10. In the embodiment illustrated in FIG. 3K, the inner wall surface of the housing 40 has four negative curvature radii in the positional range of $0 \leq X \leq X_F$ as indicated by arrows in the drawing.

As described above, according to the above embodiment, a pressure distribution (pressure gradient) is formed from the tip side to the hub side in the working fluid acting on the turbine blade 30 by adjusting the shape of the bend part 52, and at the tip side, the velocity of the working fluid (velocity component in the axial direction) increases with the pressure decrease. As a result, the turning angle of the flow of the working fluid decreases at the tip side and the pressure differential between the concave side and the convex side of the turbine blade 30 decreases, which suppresses leakage of the working fluid via the tip clearance 35. Thus, it is possible to suppress a decrease in the turbine efficiency due to the tip leakage.

It is especially advantageous for a small axial flow turbine to be able to suppress tip leakage by adjusting the shape of the bend part 52 as in the above embodiments, because, in a small axial flow turbine, the tip clearance tends to become large with respect to the blade length of the turbine blade.

The embodiments of the present invention have been described above. However, the present invention is not limited thereto, and various modifications may be applied as long as they do not depart from the object of the present invention.

For instance, while the axial flow turbine 10 for the turbocharger 1 is described in the above embodiment, the above description with respect to the axial flow turbine 10 can be applied to any axial flow turbine of radial inflow type for recovering power from energy of working fluid.

In the above embodiment, the tip-side inner wall surface 60 of the bend part 52 of the described axial flow turbine 10 is at least in the region 52A at the upstream side, in the axial direction, of the portion 36H adjacent to the hub, of the leading edge 36 of the turbine blade 30. However, a technique similar to the present invention can be applied to a mixed flow turbine as well.

Figure 6:
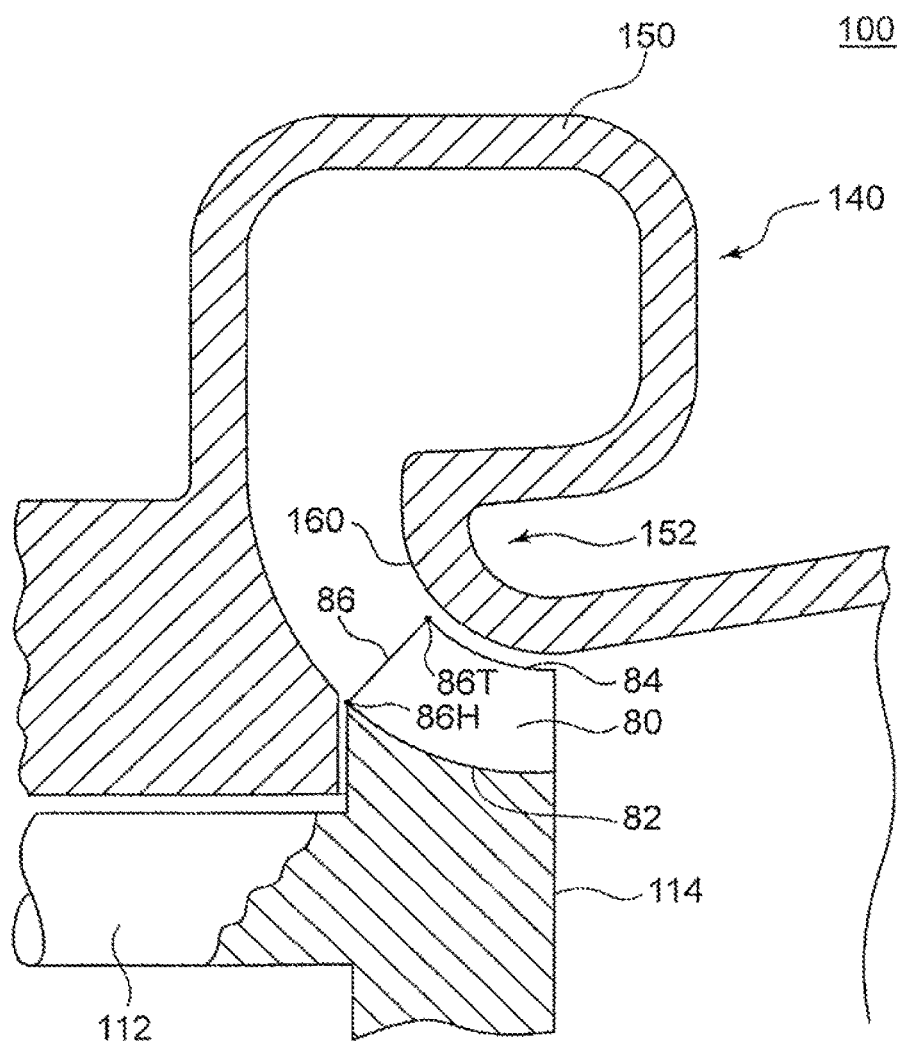
FIG. 6 is a schematic cross-sectional view of a mixed flow turbine according to a reference example.

FIG. 6 is a schematic cross-sectional view of a mixed flow turbine according to a reference example. As illustrated in the drawing, the mixed flow turbine 100 includes a rotation shaft 112 extending in the axial direction, a turbine wheel 114 which is rotatable along with the rotation shaft 112, and a housing 140 covering the turbine wheel 114. The housing 140 includes a scroll part 150 for swirling working fluid that flows into the housing 140 along the circumferential direction of the rotation shaft 112. Further, the bend part 152 of the housing 140 is disposed between the scroll part 150 and the turbine wheel 114. The tip-side inner wall surface 160 of the bend part 152 does not extend to the upstream side, in the axial direction, of a portion 86H of the leading edge 86 of the turbine blade 80 adjacent to the hub 82, and is at the downstream side, in the axial direction, of the portion 86H. In this regard, the mixed flow turbine 100 is different from the above described axial flow turbine 10. The bend shapes as in the embodiments illustrated in FIGS. 3A to 3O can be applied to the bend shape of the bend part 152 of the mixed flow turbine 100. Specifically, the bend shape of the tip-side inner wall surface 160 along the axial direction of the turbine may have the minimum curvature radius $R_{min}$ at the position $X_Z$ between an upstream position in the axial direction of the turbine represented by $X_{upst}=X_0-0.5$ w, and a downstream position in the axial direction of the turbine represented by $X_{downst}=X_0+0.5$ w, where the position in the axial direction of the starting point of the bend shape is X=0, the position in the axial direction of the leading edge 86 of a tip 84 is $X=X_0$, and W is the width along the axial direction of the turbine blade 80 at the tip 84, and have a curvature radius R ($R>R_{min}$) at the upstream side, in the axial direction, of the position $X_Z$. Also in this case, an effect similar to that of the present invention can be achieved.

DESCRIPTION OF REFERENCE NUMERALS

1 Turbocharger
10 Axial flow turbine
12 Rotation shaft
14 Turbine wheel
16 Bearing
20 Compressor
22 Compressor wheel
24 Impeller
30 Turbine blade
32 Hub
34 Tip
35 Tip clearance
36 Leading edge
38 Trailing edge
40 Housing
40A First section
40B Second section
42 Turbine housing
44 Bearing housing 46 Compressor housing
50 Scroll part
52 Bend part
54 Gas outlet
60 Tip-side inner wall surface
62 Hub-side inner wall surface
64 Maximum curvature section
70 Projecting portion
72 Annular plate portion
74 Protruding portion
80 Turbine blade
82 Hub
84 Tip
86 Leading edge
100 Mixed flow turbine
112 Rotation shaft
114 Turbine wheel
140 Housing
150 Scroll part
160 Bend part

The invention claimed is:

1. An axial flow turbine of radial-inflow type for recovering power from energy of working fluid, comprising:
a rotation shaft extending in an axial direction of the axial flow turbine, the axial direction being X;
a turbine wheel including a plurality of turbine blades each extending from a blade root to a blade tip outwardly in a radial direction of the axial flow turbine, the turbine wheel being configured to rotate together with the rotation shaft; and
a housing including a scroll part for swirling the working fluid flowing into the housing along a circumferential direction of the rotation shaft and a bend part for changing a flow direction of the working fluid flowing inwardly in the radial direction from the scroll part into a direction along the axial direction to direct a flow of the working fluid to the turbine blades, wherein the bend part includes a tip-side inner wall surface of a bend shape at least in a region at an upstream side, in the axial direction, of a portion of a leading edge of each turbine blade, the portion being adjacent to a hub, and
wherein the bend shape of the tip-side inner wall surface along the axial direction includes a first linear section, a second linear section disposed on a downstream side of the first linear section in the axial direction, and a corner section at which the first linear section intersects with the second linear section.

2. The axial flow turbine of radial-inflow type according to claim 1,
wherein the corner section is disposed at a position Xz between an upstream position in the axial direction represented by Xupst=Xo−0.5 W and a downstream position in the axial direction represented by Xdownst=Xo+0.5 W, where a position in the axial direction of a starting point of the bend shape is X=0, a position in the axial direction of the leading edge at the blade tip is X=Xo, and W is a width along the axial direction of each turbine blade at the blade tip.

3. An axial flow turbine of radial-inflow type for recovering power from energy of working fluid, comprising:
a rotation shaft extending in an axial direction of the axial flow turbine, the axial direction being X;
a turbine wheel including a plurality of turbine blades each extending from a blade root to a blade tip outwardly in a radial direction of the axial flow turbine, the turbine wheel being configured to rotate together with the rotation shaft; and
a housing including a scroll part for swirling the working fluid flowing into the housing along a circumferential direction of the rotation shaft and a bend part for changing a flow direction of the working fluid flowing inwardly in the radial direction from the scroll part into a direction along the axial direction to direct a flow of the working fluid to the turbine blades, wherein the bend part includes a tip-side inner wall surface of a bend shape at least in a region at an upstream side, in the axial direction, of a portion of a leading edge of the turbine blades, the portion being adjacent to a hub, and
wherein the bend shape of the tip-side inner wall surface along the axial direction has a minimum curvature radius at a position Xz between an upstream position in the axial direction represented by Xupst=Xo−0.5 W and a downstream position in the axial direction represented by Xdwnst=Xo+0.5 W, where a position in the axial direction of a starting point of the bend shape is X=0, a position in the axial direction of the leading edge at the blade tip is X=Xo, and W is a width along the axial direction of each turbine blade at the blade tip, and
a curvature radius at the upstream side, in the axial direction, of the position Xz, the curvature radius being greater than the minimum curvature radius.

4. The axial flow turbine of radial-inflow type according to claim 3, wherein a gap is formed between the blade tip and the inner wall surface of the housing and no seal member is provided in the gap.

5. The axial flow turbine of radial-inflow type according to claim 3,
wherein the bend shape includes a discontinuous point at which a first linear section at an upstream side of the position Xz intersects with a second linear section at a downstream side of the position Xz, and
wherein the discontinuous point has the minimum curvature radius at the position Xz.

6. The axial flow turbine of radial-inflow type according to claim 3,
wherein the bend shape of the bend part has two or more curvature radii of different sizes at least in a positional range of 0<X<Xz in the axial direction, and
wherein the two or more curvature radii are arranged in the positional range in a descending order of curvature radius toward the downstream side from the upstream side in the axial direction.

7. The axial flow turbine of radial-inflow type according to claim 3, wherein a part of the tip-side inner wall surface of the bend part is formed by a projecting portion disposed on the position Xz to project inwardly in the radial direction from other part of the tip-side inner wall surface, and
wherein a projection end of the projecting portion has the minimum curvature radius.

8. The axial flow turbine of radial-inflow type according to claim 7,
wherein the projecting portion includes an annular plate portion extending inwardly in the radial direction from the other part of the tip-side inner wall surface, and
wherein an edge of the projection end of the annular plate portion has the minimum curvature radius.

9. The axial flow turbine of radial-inflow type according to claim 7,
wherein the projection end is disposed on an outer side of the blade tip in the radial direction.

10. The axial flow turbine of radial-inflow type according to claim 7, wherein the projecting portion is disposed on an upstream side of the blade tip in the axial direction, wherein the projection end is disposed on an inner side of the blade tip in the radial direction, and wherein the housing is dividable into a first section including the projecting portion and a second section at a downstream side of the first section.

11. The axial flow turbine of radial-inflow type according to claim 3, wherein a tip surface of each turbine blade is inclined from the axial direction so that a blade length of each turbine blade gradually increases from the leading edge toward a trailing edge, and wherein the inner wall surface of the housing is inclined from the axial direction along the tip surface of each turbine blade.

12. The axial flow turbine of radial-inflow type according to claim 3, wherein the housing includes a protruding portion protruding inwardly in the radial direction at a position in the axial direction corresponding to an outlet of the turbine wheel.

13. The axial flow turbine of radial-inflow type according to claim 3, wherein a shape along the axial direction of the inner wall surface of the housing facing the blade tip has at least one negative curvature radius between the position X=0 at an upstream end of the bend part and a position offset toward the downstream side in the axial direction by a distance of D=1.5×W from the trailing edge at the blade tip of each turbine blade.

14. A turbocharger comprising an axial flow turbine of radial-inflow type configured to be driven by exhaust gas from an internal combustion engine and a compressor configured to be driven by the axial flow turbine to compress intake air to the internal combustion engine, wherein the axial flow turbine comprises:

a rotation shaft extending in an axial direction of the axial flow turbine, the axial direction being X;

a turbine wheel including a plurality of turbine blades each extending from a blade root to a blade tip outwardly in a radial direction of the axial flow turbine, the turbine wheel being configured to rotate together with the rotation shaft; and a housing including a scroll part for swirling the working fluid flowing into the housing along a circumferential direction of the rotation shaft and a bend part for changing a flow direction of the working fluid flowing inwardly in the radial direction from the scroll part into a direction along the axial direction to direct a flow of the working fluid to the turbine blades, wherein the bend part includes a tip-side inner wall surface of a bend shape at least in a region at an upstream side, in the axial direction, of a portion of a leading edge of each turbine blade, the portion being adjacent to a hub, and wherein the bend shape of the tip-side inner wall surface along the axial direction has a minimum curvature radius at a position Xz between an upstream position in the axial direction represented by Xupst=Xo−0.5 W and a downstream position in the axial direction represented by Xdwnst=Xo+0.5 W, where a position in the axial direction of a starting point of the bend shape is X=0, a position in the axial direction of the leading edge at the blade tip is X=Xo, and W is a width along the axial direction of each turbine blade at the blade tip, and a curvature radius at the upstream side, in the axial direction, of the position Xz, the curvature radius being greater than the minimum curvature radius.

* * * * *